US008203463B2

(12) United States Patent
Bragg et al.

(10) Patent No.: US 8,203,463 B2
(45) Date of Patent: Jun. 19, 2012

(54) WAKEUP AND INTERROGATION OF METER-READING DEVICES USING LICENSED NARROWBAND AND UNLICENSED WIDEBAND RADIO COMMUNICATION

(75) Inventors: Steven D. Bragg, Rolesville, NC (US); Robert W. Yost, Angier, NC (US)

(73) Assignee: Elster Electricity LLC, Raleigh, NC (US)

( * ) Notice: Subject to any disclaimer, the term of this patent is extended or adjusted under 35 U.S.C. 154(b) by 653 days.

(21) Appl. No.: 12/370,679

(22) Filed: Feb. 13, 2009

(65) Prior Publication Data

US 2010/0207784 A1    Aug. 19, 2010

(51) Int. Cl.
*G08C 15/06* (2006.01)
(52) U.S. Cl. .............................. 340/870.02; 340/870.04
(58) Field of Classification Search . 340/870.02–870.04
See application file for complete search history.

(56) References Cited

U.S. PATENT DOCUMENTS

| | | | |
|---|---|---|---|
| 3,445,815 A | 5/1969 | Saltzberg et al. |
| 3,858,212 A | 12/1974 | Tompkins et al. |
| 3,878,512 A | 4/1975 | Kobayashi et al. |
| 3,973,240 A | 8/1976 | Fong |
| 4,031,513 A | 6/1977 | Simciak |
| 4,056,107 A | 11/1977 | Todd et al. |
| 4,066,964 A | 1/1978 | Costanza et al. |
| 4,132,981 A | 1/1979 | White |
| 4,190,800 A | 2/1980 | Kelly, Jr. et al. |
| 4,204,195 A | 5/1980 | Bogacki |
| 4,218,737 A | 8/1980 | Buscher et al. |
| 4,250,489 A | 2/1981 | Dudash et al. |
| 4,254,472 A | 3/1981 | Juengel et al. |
| 4,319,358 A | 3/1982 | Sepp |
| 4,321,582 A | 3/1982 | Banghart |
| 4,322,842 A | 3/1982 | Martinez |
| 4,328,581 A | 5/1982 | Harmon et al. |
| 4,361,851 A | 11/1982 | Asip et al. |
| 4,361,890 A | 11/1982 | Green, Jr. et al. |
| 4,396,915 A | 8/1983 | Farnsworth et al. |
| 4,405,829 A | 9/1983 | Rivest et al. |
| 4,415,896 A | 11/1983 | Allgood |
| 4,466,001 A | 8/1984 | Moore et al. |
| 4,504,831 A | 3/1985 | Jahr et al. |
| 4,506,386 A | 3/1985 | Ichikawa et al. |
| 4,513,415 A | 4/1985 | Martinez |
| 4,525,861 A | 6/1985 | Freeburg |
| 4,600,923 A | 7/1986 | Hicks et al. |
| 4,608,699 A | 8/1986 | Batlivala et al. |
| 4,611,333 A | 9/1986 | McCallister et al. |
| 4,614,945 A | 9/1986 | Brunius et al. |
| 4,617,566 A | 10/1986 | Diamond |
| 4,628,313 A | 12/1986 | Gombrich et al. |
| 4,631,538 A | 12/1986 | Carreno |
| 4,638,298 A | 1/1987 | Spiro |
| 4,644,321 A | 2/1987 | Kennon |
| 4,653,076 A | 3/1987 | Jerrim et al. |

(Continued)

*Primary Examiner* — Danny Nguyen
(74) *Attorney, Agent, or Firm* — Woodcock Washburn LLP

(57) ABSTRACT

A meter data collection system in which a licensed narrowband frequency channel is used to wake up carrier-sensed, battery-powered meter reading devices (MRDs) is disclosed herein. In the meter data collection system disclosed herein, an unlicensed wideband channel is used to transmit data replies from the MRDs to a mobile data collection device. In another embodiment disclosed herein, a meshed network of MRDs communicating on the unlicensed channel is combined with a roaming interrogator that uses the licensed channel to send commands or to perform on-demand reads.

18 Claims, 10 Drawing Sheets

U.S. PATENT DOCUMENTS

| | | |
|---|---|---|
| 4,672,555 A | 6/1987 | Hart et al. |
| 4,680,704 A | 7/1987 | Konicek et al. |
| 4,688,038 A | 8/1987 | Giammarese |
| 4,692,761 A | 9/1987 | Robinton |
| 4,707,852 A | 11/1987 | Jahr et al. |
| 4,713,837 A | 12/1987 | Gordon |
| 4,724,435 A | 2/1988 | Moses et al. |
| 4,728,950 A | 3/1988 | Hendrickson et al. |
| 4,734,680 A | 3/1988 | Gehman et al. |
| 4,749,992 A | 6/1988 | Fitzemeyer et al. |
| 4,757,456 A | 7/1988 | Benghiat |
| 4,769,772 A | 9/1988 | Dwyer |
| 4,783,748 A | 11/1988 | Swarztrauber et al. |
| 4,792,946 A | 12/1988 | Mayo |
| 4,799,059 A | 1/1989 | Grindahl et al. |
| 4,804,938 A | 2/1989 | Rouse et al. |
| 4,804,957 A | 2/1989 | Selph et al. |
| 4,811,011 A | 3/1989 | Sollinger |
| 4,827,514 A | 5/1989 | Ziolko et al. |
| 4,833,618 A | 5/1989 | Verma et al. |
| 4,839,645 A | 6/1989 | Lill |
| 4,841,545 A | 6/1989 | Endo et al. |
| 4,860,379 A | 8/1989 | Schoeneberger et al. |
| 4,862,493 A | 8/1989 | Venkataraman et al. |
| 4,868,877 A | 9/1989 | Fischer |
| 4,884,021 A | 11/1989 | Hammond et al. |
| 4,912,722 A | 3/1990 | Carlin |
| 4,922,518 A | 5/1990 | Gordon et al. |
| 4,939,726 A | 7/1990 | Flammer et al. |
| 4,940,974 A | 7/1990 | Sojka |
| 4,940,976 A | 7/1990 | Gastouniotis et al. |
| 4,958,359 A | 9/1990 | Kato |
| 4,964,138 A | 10/1990 | Nease et al. |
| 4,965,533 A | 10/1990 | Gilmore |
| 4,972,507 A | 11/1990 | Lusignan |
| 5,007,052 A | 4/1991 | Flammer |
| 5,018,165 A | 5/1991 | Sohner et al. |
| 5,022,046 A | 6/1991 | Morrow, Jr. |
| 5,032,833 A | 7/1991 | Laporte |
| 5,053,766 A | 10/1991 | Ruiz-del-Portal et al. |
| 5,053,774 A | 10/1991 | Schuermann et al. |
| 5,056,107 A | 10/1991 | Johnson et al. |
| 5,067,136 A | 11/1991 | Arthur et al. |
| 5,079,715 A | 1/1992 | Venkataraman et al. |
| 5,079,768 A | 1/1992 | Flammer |
| 5,086,292 A | 2/1992 | Johnson et al. |
| 5,086,385 A | 2/1992 | Launey |
| 5,090,024 A | 2/1992 | Vander Mey et al. |
| 5,111,479 A | 5/1992 | Akazawa |
| 5,115,433 A | 5/1992 | Baran et al. |
| 5,115,448 A | 5/1992 | Mori |
| 5,129,096 A | 7/1992 | Burns |
| 5,130,987 A | 7/1992 | Flammer |
| 5,132,985 A | 7/1992 | Hashimoto et al. |
| 5,136,614 A | 8/1992 | Hiramatsu et al. |
| 5,142,694 A | 8/1992 | Jackson et al. |
| 5,151,866 A | 9/1992 | Glaser et al. |
| 5,155,481 A | 10/1992 | Brennan, Jr. et al. |
| 5,160,926 A | 11/1992 | Schweitzer, III |
| 5,166,664 A | 11/1992 | Fish |
| 5,177,767 A | 1/1993 | Kato |
| 5,179,376 A | 1/1993 | Pomatto |
| 5,189,694 A | 2/1993 | Garland |
| 5,194,860 A | 3/1993 | Jones et al. |
| 5,197,095 A | 3/1993 | Bonnet |
| 5,204,877 A | 4/1993 | Endo et al. |
| 5,214,587 A | 5/1993 | Green |
| 5,225,994 A | 7/1993 | Arinobu et al. |
| 5,228,029 A | 7/1993 | Kotzin |
| 5,229,996 A | 7/1993 | Bäckström et al. |
| 5,239,575 A | 8/1993 | White et al. |
| 5,239,584 A | 8/1993 | Hershey et al. |
| 5,243,338 A | 9/1993 | Brennan, Jr. et al. |
| 5,252,967 A | 10/1993 | Brennan et al. |
| 5,260,943 A | 11/1993 | Comroe et al. |
| 5,270,704 A | 12/1993 | Sosa Quintana et al. |
| 5,280,498 A | 1/1994 | Tymes et al. |
| 5,280,499 A | 1/1994 | Suzuki |
| 5,285,469 A | 2/1994 | Vanderpool |
| 5,287,287 A | 2/1994 | Chamberlain et al. |
| 5,289,497 A | 2/1994 | Jacobson et al. |
| 5,295,154 A | 3/1994 | Meier et al. |
| 5,307,349 A | 4/1994 | Shloss et al. |
| 5,311,541 A | 5/1994 | Sanderford, Jr. |
| 5,311,542 A | 5/1994 | Eder |
| 5,315,531 A | 5/1994 | Oravetz et al. |
| 5,319,679 A | 6/1994 | Bagby |
| 5,329,547 A | 7/1994 | Ling |
| 5,345,225 A | 9/1994 | Davis |
| 5,359,625 A | 10/1994 | Vander Mey et al. |
| 5,377,222 A | 12/1994 | Sanderford, Jr. |
| 5,381,462 A | 1/1995 | Larson et al. |
| 5,383,134 A | 1/1995 | Wrzesinski |
| 5,384,712 A | 1/1995 | Oravetz et al. |
| 5,387,873 A | 2/1995 | Muller et al. |
| 5,390,360 A | 2/1995 | Scop et al. |
| 5,406,495 A | 4/1995 | Hill |
| 5,416,917 A | 5/1995 | Adair et al. |
| 5,420,799 A | 5/1995 | Peterson et al. |
| 5,428,636 A | 6/1995 | Meier |
| 5,430,759 A | 7/1995 | Yokev et al. |
| 5,432,507 A | 7/1995 | Mussino et al. |
| 5,432,815 A | 7/1995 | Kang et al. |
| 5,438,329 A | 8/1995 | Gastouniotis et al. |
| 5,448,230 A | 9/1995 | Schanker et al. |
| 5,448,570 A | 9/1995 | Toda et al. |
| 5,450,088 A | 9/1995 | Meier et al. |
| 5,452,465 A | 9/1995 | Geller et al. |
| 5,455,533 A | 10/1995 | Köllner |
| 5,455,544 A | 10/1995 | Kechkaylo |
| 5,455,569 A | 10/1995 | Sherman et al. |
| 5,455,822 A | 10/1995 | Dixon et al. |
| 5,457,713 A | 10/1995 | Sanderford, Jr. et al. |
| 5,461,558 A | 10/1995 | Patsiokas et al. |
| 5,463,657 A | 10/1995 | Rice |
| 5,473,322 A | 12/1995 | Carney |
| 5,475,742 A | 12/1995 | Gilbert |
| 5,475,867 A | 12/1995 | Blum |
| 5,479,442 A | 12/1995 | Yamamoto |
| 5,481,259 A | 1/1996 | Bane |
| 5,488,608 A | 1/1996 | Flammer, III |
| 5,491,473 A | 2/1996 | Gilbert |
| 5,493,287 A | 2/1996 | Bane |
| 5,495,239 A | 2/1996 | Ouellette |
| 5,497,424 A | 3/1996 | Vanderpool |
| 5,499,243 A | 3/1996 | Hall |
| 5,500,871 A | 3/1996 | Kato et al. |
| 5,511,188 A | 4/1996 | Pascucci et al. |
| 5,519,388 A | 5/1996 | Adair, Jr. |
| 5,521,910 A | 5/1996 | Matthews |
| 5,522,044 A | 5/1996 | Pascucci et al. |
| 5,524,280 A | 6/1996 | Douthitt et al. |
| 5,525,898 A | 6/1996 | Lee, Jr. et al. |
| 5,526,389 A | 6/1996 | Buell et al. |
| 5,528,507 A | 6/1996 | McNamara et al. |
| 5,528,597 A | 6/1996 | Gerszberg et al. |
| 5,539,775 A | 7/1996 | Tuttle et al. |
| 5,541,589 A | 7/1996 | Delaney |
| 5,544,036 A | 8/1996 | Brown, Jr. et al. |
| 5,546,424 A | 8/1996 | Miyake |
| 5,548,527 A | 8/1996 | Hemminger et al. |
| 5,548,633 A | 8/1996 | Kujawa et al. |
| 5,553,094 A | 9/1996 | Johnson et al. |
| 5,555,508 A | 9/1996 | Munday et al. |
| 5,559,870 A | 9/1996 | Patton et al. |
| 5,566,332 A | 10/1996 | Adair et al. |
| 5,570,084 A | 10/1996 | Ritter et al. |
| 5,572,438 A | 11/1996 | Ehlers et al. |
| 5,574,657 A | 11/1996 | Tofte |
| 5,590,179 A | 12/1996 | Shincovich et al. |
| 5,592,470 A | 1/1997 | Rudrapatna et al. |
| 5,594,740 A | 1/1997 | LaDue |
| 5,602,744 A | 2/1997 | Meek et al. |
| 5,617,084 A | 4/1997 | Sears |
| 5,619,192 A | 4/1997 | Ayala |
| 5,619,685 A | 4/1997 | Schiavone |
| 5,621,629 A | 4/1997 | Hemminger et al. |

| | | | | | | |
|---|---|---|---|---|---|---|
| 5,627,759 A | 5/1997 | Bearden et al. | | 6,035,201 A | 3/2000 | Whitehead |
| 5,631,636 A | 5/1997 | Bane | | 6,041,056 A | 3/2000 | Bigham et al. |
| 5,636,216 A | 6/1997 | Fox et al. | | 6,061,604 A | 5/2000 | Russ et al. |
| 5,640,679 A | 6/1997 | Lundqvist et al. | | 6,067,029 A | 5/2000 | Durston |
| 5,659,300 A | 8/1997 | Dresselhuys et al. | | 6,073,169 A | 6/2000 | Shuey et al. |
| 5,668,803 A | 9/1997 | Tymes et al. | | 6,073,174 A | 6/2000 | Montgomerie et al. |
| 5,668,828 A | 9/1997 | Sanderford, Jr. et al. | | 6,078,251 A | 6/2000 | Landt et al. |
| 5,673,252 A | 9/1997 | Johnson et al. | | 6,078,909 A | 6/2000 | Knutson |
| 5,684,472 A | 11/1997 | Bane | | 6,088,659 A | 7/2000 | Kelley et al. |
| 5,684,799 A | 11/1997 | Bigham et al. | | 6,091,758 A | 7/2000 | Ciccone et al. |
| 5,691,715 A | 11/1997 | Ouellette | | 6,100,817 A | 8/2000 | Mason, Jr. et al. |
| 5,692,180 A | 11/1997 | Lee | | 6,112,192 A | 8/2000 | Capek |
| 5,696,501 A | 12/1997 | Ouellette et al. | | 6,124,806 A | 9/2000 | Cunningham et al. |
| 5,696,765 A | 12/1997 | Safadi | | 6,128,276 A | 10/2000 | Agee |
| 5,696,903 A | 12/1997 | Mahany | | 6,137,423 A | 10/2000 | Glorioso et al. |
| 5,699,276 A | 12/1997 | Roos | | 6,150,955 A | 11/2000 | Tracy et al. |
| 5,714,931 A | 2/1998 | Petite et al. | | 6,154,487 A | 11/2000 | Murai et al. |
| 5,715,390 A | 2/1998 | Hoffman et al. | | 6,160,993 A | 12/2000 | Wilson |
| 5,717,604 A | 2/1998 | Wiggins | | 6,172,616 B1 | 1/2001 | Johnson et al. |
| 5,719,564 A | 2/1998 | Sears | | 6,195,018 B1 | 2/2001 | Ragle et al. |
| 5,745,901 A | 4/1998 | Entner et al. | | 6,199,068 B1 | 3/2001 | Carpenter |
| 5,748,104 A | 5/1998 | Argyroudis et al. | | 6,208,266 B1 | 3/2001 | Lyons et al. |
| 5,748,619 A | 5/1998 | Meier | | 6,218,953 B1 | 4/2001 | Petite |
| 5,751,914 A | 5/1998 | Coley et al. | | 6,233,327 B1 | 5/2001 | Petite |
| 5,751,961 A | 5/1998 | Smyk | | 6,246,677 B1 | 6/2001 | Nap et al. |
| 5,754,772 A | 5/1998 | Leaf | | 6,249,516 B1 | 6/2001 | Brownrigg et al. |
| 5,754,830 A | 5/1998 | Butts et al. | | 6,333,975 B1 | 12/2001 | Brunn et al. |
| 5,757,783 A | 5/1998 | Eng et al. | | 6,363,057 B1 | 3/2002 | Ardalan et al. |
| 5,768,148 A | 6/1998 | Murphy et al. | | 6,373,399 B1 | 4/2002 | Johnson et al. |
| 5,778,368 A | 7/1998 | Hogan et al. | | 6,393,341 B1 | 5/2002 | Lawrence et al. |
| 5,787,437 A | 7/1998 | Potterveld et al. | | 6,396,839 B1 | 5/2002 | Ardalan et al. |
| 5,790,789 A | 8/1998 | Suarez | | 6,421,731 B1 | 7/2002 | Ciotti, Jr. et al. |
| 5,790,809 A | 8/1998 | Holmes | | 6,430,268 B1 | 8/2002 | Petite |
| 5,801,643 A | 9/1998 | Williams et al. | | 6,437,692 B1 | 8/2002 | Petite et al. |
| 5,805,712 A | 9/1998 | Davis | | 6,446,192 B1 | 9/2002 | Narasimhan et al. |
| 5,808,558 A | 9/1998 | Meek et al. | | 6,643,278 B1 | 11/2003 | Panasik et al. |
| 5,809,059 A | 9/1998 | Souissi et al. | | 6,657,549 B1 | 12/2003 | Avery |
| 5,822,521 A | 10/1998 | Gartner et al. | | 6,684,245 B1 | 1/2004 | Shuey et al. |
| 5,850,187 A | 12/1998 | Carrender et al. | | 6,751,563 B1 | 6/2004 | Spanier et al. |
| 5,862,391 A | 1/1999 | Salas et al. | | 6,867,707 B1 | 3/2005 | Kelley et al. |
| 5,872,774 A | 2/1999 | Wheatley, III et al. | | 6,996,215 B2 | 2/2006 | MacConnell |
| 5,874,903 A | 2/1999 | Shuey et al. | | 7,412,235 B2 | 8/2008 | Larson et al. |
| 5,875,183 A | 2/1999 | Nitadori | | 2001/0002210 A1 | 5/2001 | Petite |
| 5,875,402 A | 2/1999 | Yamawaki | | 2001/0024163 A1 | 9/2001 | Petite |
| 5,884,184 A | 3/1999 | Sheffer | | 2002/0012323 A1 | 1/2002 | Petite et al. |
| 5,892,758 A | 4/1999 | Argyroudis | | 2002/0013679 A1 | 1/2002 | Petite |
| 5,896,382 A | 4/1999 | Davis et al. | | 2002/0019712 A1 | 2/2002 | Petite et al. |
| 5,897,607 A | 4/1999 | Jenney et al. | | 2002/0019725 A1 | 2/2002 | Petite |
| 5,898,387 A | 4/1999 | Davis et al. | | 2002/0026957 A1 | 3/2002 | Reyman |
| 5,907,491 A | 5/1999 | Canada et al. | | 2002/0027504 A1 | 3/2002 | Davis et al. |
| 5,907,540 A | 5/1999 | Hayashi | | 2002/0031101 A1 | 3/2002 | Petite et al. |
| 5,910,799 A | 6/1999 | Carpenter et al. | | 2002/0094799 A1 | 7/2002 | Elliott et al. |
| 5,914,673 A * | 6/1999 | Jennings et al. ......... 340/870.03 | | 2002/0125998 A1 | 9/2002 | Petite et al. |
| 5,923,269 A | 7/1999 | Shuey et al. | | 2002/0145537 A1 | 10/2002 | Mueller et al. |
| 5,926,103 A | 7/1999 | Petite | | 2002/0159426 A1 | 10/2002 | Kanemoto et al. |
| 5,926,531 A | 7/1999 | Petite | | 2002/0169643 A1 | 11/2002 | Petite et al. |
| 5,943,375 A | 8/1999 | Veintimilla | | 2003/0036810 A1 | 2/2003 | Petite |
| 5,944,842 A | 8/1999 | Propp et al. | | 2003/0036822 A1 | 2/2003 | Davis et al. |
| 5,953,319 A | 9/1999 | Dutta et al. | | 2003/0123442 A1 | 7/2003 | Drucker et al. |
| 5,958,018 A | 9/1999 | Eng et al. | | 2003/0202512 A1 | 10/2003 | Kennedy |
| 5,959,550 A | 9/1999 | Giles | | 2004/0001008 A1 | 1/2004 | Shuey et al. |
| 5,960,074 A | 9/1999 | Clark | | 2004/0113810 A1 | 6/2004 | Mason, Jr. et al. |
| 5,963,146 A | 10/1999 | Johnson et al. | | 2005/0121526 A1 | 6/2005 | Stewart et al. |
| 5,974,236 A | 10/1999 | Sherman | | 2005/0184881 A1 | 8/2005 | Dusenberry et al. |
| 5,986,574 A | 11/1999 | Colton | | 2005/0270173 A1 | 12/2005 | Boaz |
| 6,000,034 A | 12/1999 | Lightbody et al. | | 2008/0259844 A1* | 10/2008 | Richeson et al. ............. 370/328 |
| 6,028,522 A | 2/2000 | Petite | | | | |
| 6,034,988 A | 3/2000 | VanderMey et al. | | * cited by examiner | | |

WAKEUP AND INTERROGATION OF METER-READING DEVICES USING LICENSED NARROWBAND AND UNLICENSED WIDEBAND RADIO COMMUNICATION

TECHNICAL BACKGROUND

Automated systems exist for collecting data from meters that measure usage of resources, such as gas, water and electricity. Such systems may employ a number of different infrastructures for collecting this meter data from the meters. For example, some automated systems obtain data from the meters using a fixed wireless network that includes, for example, a central node in communication with a number of endpoint nodes (e.g., meter reading devices (MRDs) connected to meters). At the endpoint nodes, the wireless communications circuitry may be incorporated into the meters themselves, such that each endpoint node in the wireless network comprises a meter connected to an MRD that has wireless communication circuitry that enables the MRD to transmit the meter data of the meter to which it is connected. The endpoint nodes may either transmit their meter data directly to the central node, or indirectly though one or more intermediate bi-directional nodes which serve as repeaters for the meter data of the transmitting node. Some networks operating in this manner are referred to as "mesh" networks.

Although the fixed wireless network infrastructure is an efficient infrastructure for collecting data from MRDs, there are a number of scenarios in which a fixed wireless network may, at least temporarily, not be an optimal infrastructure for collecting data from at least some of the MRDs in a particular metering system. In particular, for an operator of a metering system, setting up, expanding, and/or maintaining a large fixed wireless network may require a significant investment of financial capital. Additionally, setting up or expanding a large fixed wireless network may require time to plan the location of each node in the network, time to build up and/or access each location, and time to actually install the necessary wireless communications equipment at each location. Thus, for example, in some scenarios, a metering system operator may simply not yet have enough financial capital or the necessary time to build a new wireless network or expand an existing wireless network to include certain MRDs within the system. This is especially true for outlying MRDs that are located along the geographic boundaries of the system or in sparsely populated or sparsely developed areas. These MRDs may be located too far away to transmit their metering data to any of the existing repeater nodes in an existing fixed wireless network. Thus, it may be advantageous to defer building or expanding a wireless network to include these outlying MRDs until the outlying locations become more populated or developed or until the costs associated with building or expanding the wireless network can be otherwise incurred.

In these and other scenarios, until the fixed wireless network is built or expanded to include these MRDs, other network infrastructures may be at least temporarily employed to collect the meter data from the MRDs. One such other network infrastructure, which will hereinafter be referred to as the "mobile data collection" infrastructure, involves the use of a mobile data collection device, or interrogator, that can be transported to the site of each MRD to collect the meter data from each MRD. The mobile infrastructure may employ data collection techniques that are commonly referred to as "walk by" or "drive by." The "walk by" techniques may involve the use of a smaller size mobile data collection device which can be transported by one or more people on foot. The "drive by" techniques may involve the use of a somewhat larger mobile data collection device that is transported by a vehicle such as a van or small truck. The "walk by" techniques are thus more suitable for MRDs that are dispersed throughout smaller areas or areas that cannot be accessed using a vehicle. The "drive by" techniques are thus more suitable for MRDs that are dispersed throughout larger areas that are vehicle accessible.

In order to enable MRDs in mobile data collection networks to send out a higher powered transmission signal while still conserving the long term power supply of the meters, some conventional mobile data collection networks have employed a sleep/wake cycle to regulate transmission of meter data from the MRDs. The idea behind the sleep/wake cycle is that it is only necessary for an MRD to transmit its meter data while the mobile data collection device is within the transmission range of the MRD. Thus, the mobile data collection device will transmit a "wake signal" to notify a particular MRD that the mobile data collection device is approaching the physical proximity of the MRD. Accordingly, the MRD will typically begin its operation in the low power sleep mode in which it does not transmit meter data. Then, when the mobile data collection device approaches the MRD, the MRD will receive the wake signal from the mobile device. The wake signal will cause the MRD to "wake up" and transition into a higher power wake mode in which it transmits its meter data to the mobile device. Then, after transmitting its meter data, the MRD will transition back into the sleep mode, thereby once again conserving its power supply.

In some conventional mobile data collection networks that employ sleep/wake cycles as described above, the mobile data collection device transmits the wake signal to the MRD using an unlicensed frequency band, such as an Industrial, Scientific, and Medical (ISM) band. Examples of ISM bands include frequency bands having respective center frequencies of 915 MHz and 2.4 GHz. Using unlicensed frequency bands affords certain advantages for battery-powered MRDs. For instance, unlicensed frequency bands generally support wide bandwidths and, therefore, high bitrates for communication of large blocks of data, as may be collected in MRDs. Further, the regulatory rules for unlicensed frequency bands are written to allow a large number of devices to coexist. This feature may be particularly advantageous in the context of networks in which many MRDs are deployed, such as, for example, networks operated by large electric, gas, or water utilities.

Although using an unlicensed frequency band to wake MRDs through carrier-sensed radio receivers results in some advantages, this technique also suffers from certain drawbacks. For example, unlicensed frequency bands are often crowded with large numbers of communication devices of many different manufacturers and types. As a result, particularly in densely populated areas, any particular channel of the unlicensed frequency band may have large amounts of traffic. This traffic can cause interference that results in false wakeups. That is, MRDs may transition to the higher power wake mode even when no mobile data collection device, or interrogator, is within range. These false wakeups may increase power consumption and adversely affect the battery life of the MRDs.

Even so-called spread spectrum devices can be affected by false wakeups. Further, spread spectrum techniques, such as direct sequence spreading or frequency hopping, add another challenge for operating battery-powered MRDs in unlicensed frequency bands. Spread spectrum techniques typically require lengthy and complex methods for the receiver in the MRD to become frequency-, time-, and/or code-synchronized with the transmitter in the interrogator. These methods put an undesirable drain on battery-powered MRDs, especially if the process has to be repeated due to false wakeups.

Thus, there is a need in the art for a meter data collection system in which false wakeups and interrogator-MRD synchronization time are reduced while maintaining communication throughput.

SUMMARY OF THE DISCLOSURE

A meter data collection system in which a licensed narrowband frequency channel is used to wake up carrier-sensed, battery-powered meter reading devices (MRDs) is disclosed herein. In the meter data collection system disclosed herein, an unlicensed wideband channel is used to transmit data replies from the MRDs to a mobile data collection device. In another embodiment disclosed herein, a meshed network of MRDs communicating on the unlicensed channel is combined with a roaming interrogator that uses the licensed channel to send commands or to perform on-demand reads.

In one embodiment, a meter reading device includes a transceiver configured and arranged to transmit and receive radio signals. A processor is in electrical communication with the transceiver and is configured and arranged to execute processor-executable instructions to control operation of the meter reading device. A memory is in electrical communication with the processor and storing processor-executable instructions. When the instructions are executed by the processor, the instructions cause the processor to control the operation of the meter reading device to operate in one of four selected modes: (1) sleep mode, in which the transceiver periodically listens on a licensed channel for a carrier signal; (2) rouse mode in which the transceiver receives data via the licensed channel; (3) wake mode in which the meter reading device processes the data received via the licensed channel in the rouse mode, and (4) reply mode in which the transceiver transmits a reply on an unlicensed channel having a broader bandwidth than the licensed channel. The selected mode in which the meter reading device operates is reconfigurable.

Another embodiment is directed to a method of operating an interrogator device comprising a transceiver. The transceiver is caused to emit a carrier signal (with or without a preamble pattern modulated on the carrier) on a licensed channel. The carrier signal causes a meter reading device to transition from a sleep mode to a rouse mode. Data is transmitted from the interrogator device to the meter reading device using the licensed channel. The data comprises a preamble, an address of the meter reading device, a command, and a plurality of checksum bits. A reply is received from the meter reading device on an unlicensed channel having a broader bandwidth and therefore higher bitrate than the licensed channel, allowing a large amount of collected data in the MRD to be returned in a short time.

According to yet another embodiment, a method of operating a meter reading device comprising a transceiver is disclosed. The method comprises operating the meter reading device in a sleep mode in which the transceiver periodically listens on a licensed channel for a carrier signal from an interrogator. When a carrier signal is received from the interrogator, the meter reading device is commanded by its internal processor to transition to operation in a rouse mode in which the transceiver receives data from the interrogator via the licensed channel. If it is determined that the data received from the interrogator is addressed to the meter reading device, the meter reading device transitions to operation in a wake mode in which the meter reading device processes the data received from the interrogator via the licensed channel. If it is determined that the data received from the interrogator requires a reply, the meter reading device transitions to operation in a reply mode in which the meter reading device transmits the reply to the interrogator using an unlicensed channel having a broader bandwidth than the licensed channel. After the transmission of the reply, the MRD may transition back to either wake mode or sleep mode, according to the command received and/or the MRD configuration stored in its memory.

Various embodiments may realize certain advantages. For example, the licensed channel used for waking up MRDs typically has much lower levels of traffic than the unlicensed channel used in some conventional mobile data collection networks. As a result, false wakeups that are attributable to interference are reduced. The time involved in synchronizing the interrogator with the MRDs is also reduced. At the same time, because the unlicensed channel that is used for transmitting replies from the MRDs to the interrogator has a wider bandwidth than the licensed channel, communication throughput is high.

Other features and advantages of the invention may become apparent from the following detailed description and accompanying drawings.

BRIEF DESCRIPTION OF THE DRAWINGS

The foregoing summary, as well as the following detailed description of various embodiments, is better understood when read in conjunction with the appended drawings. For the purpose of illustrating the invention, there are shown in the drawings exemplary embodiments of various aspects of the invention; however, the invention is not limited to the specific methods and instrumentalities disclosed. In the drawings.

DETAILED DESCRIPTION OF ILLUSTRATIVE EMBODIMENTS

Exemplary systems and methods for gathering meter data are described below with reference to FIGS. 1-9. It will be appreciated by those of ordinary skill in the art that the description given herein with respect to those figures is for exemplary purposes only and is not intended in any way to limit the scope of potential embodiments.

Generally, a plurality of meter devices, which operate to track usage of a service or commodity such as, for example, electricity, water, and gas, are operable to wirelessly communicate. One or more devices, referred to herein as "collectors," are provided that "collect" data transmitted by the other meter devices so that it can be accessed by other computer systems, such as a metering automation server (MAS). The collectors receive and compile metering data from a plurality of meter devices via wireless communications. A metering automation server may communicate with the collectors to retrieve the compiled meter data, and communicate with computer systems that prepare customer billing.

Figure 1:
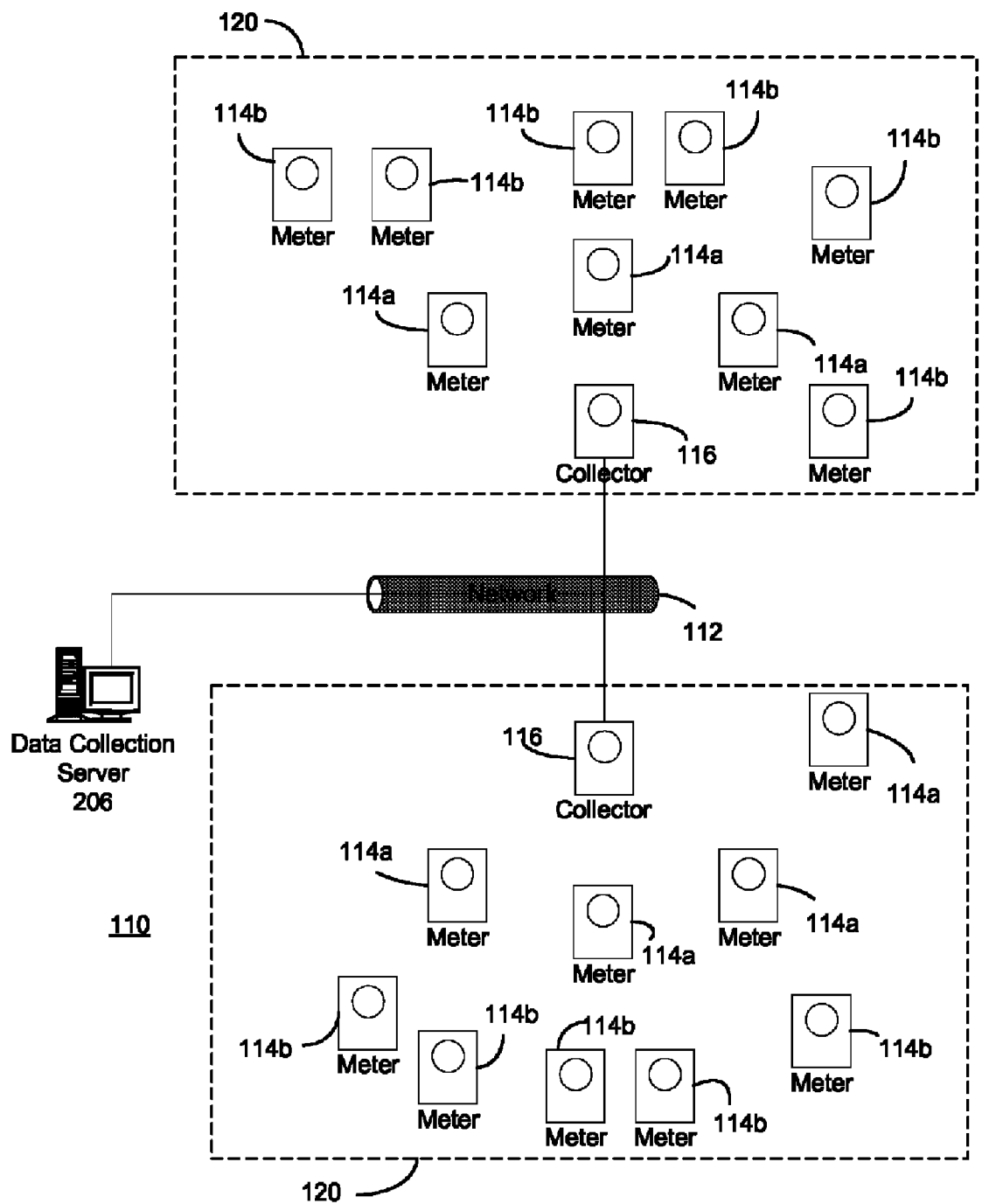
FIG. 1 is a diagram of an exemplary metering system.

FIG. 1 provides a diagram of one exemplary metering system 110. System 110 comprises a plurality of meters 114, which are operable to sense and record consumption or usage of a service or commodity such as, for example, electricity, water, or gas. Meters 114 may be located at customer premises such as, for example, a home or place of business. Meters 114 comprise circuitry for measuring the consumption of the service or commodity being consumed at their respective locations and for generating data reflecting the consumption, as well as other data related thereto. Meters 114 may also comprise circuitry for wirelessly transmitting data generated by the meter to a remote location. Meters 114 may further comprise circuitry for receiving data, commands or instructions wirelessly as well. Meters that are operable to both receive and transmit data may be referred to as "bi-directional" or "two-way" meters, while meters that are only capable of transmitting data may be referred to as "transmit-only" or "one-way" meters. In bidirectional meters, the circuitry for transmitting and receiving may comprise a transceiver. In an illustrative embodiment, meters 114 may be, for example, electricity meters manufactured by Elster Electricity, LLC and marketed under the tradename REX.

System 110 further comprises collectors 116. In one embodiment, collectors 116 are also meters operable to detect and record usage of a service or commodity such as, for example, electricity, water, or gas. In another embodiment, collectors 116 may be standalone communication nodes, without the capability of metering of service or commodity. In addition, collectors 116 are operable to send data to and receive data from meters 114. Thus, like the meters 114, the collectors 116 may comprise both circuitry for measuring the consumption of a service or commodity and for generating data reflecting the consumption and circuitry for transmitting and receiving data. In one embodiment, collector 116 and meters 114 communicate with and amongst one another using any one of several wireless techniques such as, for example, frequency hopping spread spectrum (FHSS) and direct sequence spread spectrum (DSSS).

A collector 116 and the meters 114 with which it communicates define a subnet/LAN 120 of system 110. As used herein, meters 114 and collectors 116 may be referred to as "nodes" in the subnet 120. In each subnet/LAN 120, each meter transmits data related to consumption of the commodity being metered at the meter's location. The collector 116 receives the data transmitted by each meter 114, effectively "collecting" it, and then periodically transmits the data from all of the meters in the subnet/LAN 120 to a metering automation server 206. The metering automation server 206 stores the data for analysis and preparation of bills, for example. The metering automation server 206 may be a specially programmed general purpose computing system and may communicate with collectors 116 via a network 112. The network 112 may comprise any form of network, including a wireless network or a fixed-wire network, such as a local area network (LAN), a wide area network, the Internet, an intranet, a telephone network, such as the public switched telephone network (PSTN), a public wireless (cellular) network, a Frequency Hopping Spread Spectrum (FHSS) radio network, a mesh network, a Wi-Fi (802.11) network, a Wi-Max (802.16) network, a land line (POTS) network, or any combination of the above.

Figure 2:
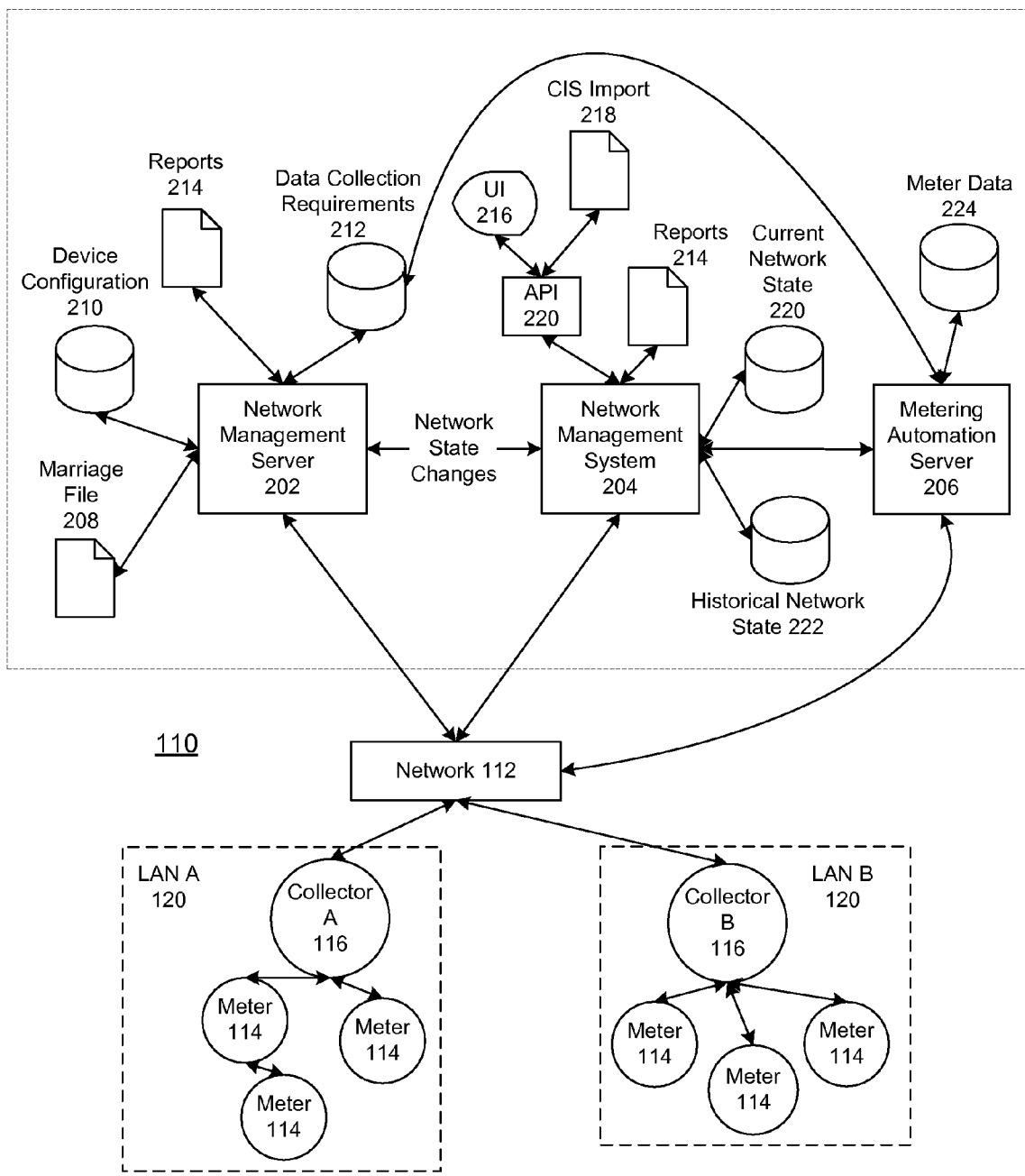
FIG. 2 expands upon the diagram of FIG. 1 and illustrates an exemplary metering system in greater detail.

Referring now to FIG. 2, further details of the metering system 110 are shown. Typically, the system will be operated by a utility company or a company providing information technology services to a utility company. As shown, the system 110 comprises a network management server 202, a network management system (NMS) 204 and the metering automation server 206 that together manage one or more subnets/LANs 120 and their constituent nodes. The NMS 204 tracks changes in network state, such as new nodes registering/unregistering with the system 110, node communication paths changing, etc. This information is collected for each subnet/LAN 120 and is detected and forwarded to the network management server 202 and metering automation server 206.

Each of the meters 114 and collectors 116 is assigned an identifier (LAN ID) that uniquely identifies that meter or collector on its subnet/LAN 120. In this embodiment, communication between nodes (i.e., the collectors and meters) and the system 110 is accomplished using the LAN ID. However, it is preferable for operators of a utility to query and communicate with the nodes using their own identifiers. To this end, a marriage file 208 may be used to correlate a utility's identifier for a node (e.g., a utility serial number) with both a manufacturer serial number (i.e., a serial number assigned by the manufacturer of the meter) and the LAN ID for each node in the subnet/LAN 120. In this manner, the utility can refer to the meters and collectors by the utilities identifier, while the system can employ the LAN ID for the purpose of designating particular meters during system communications.

A device configuration database 210 stores configuration information regarding the nodes. For example, in the metering system 200, the device configuration database may include data regarding time of use (TOU) switchpoints, etc. for the meters 114 and collectors 116 communicating in the system 110. A data collection requirements database 212 contains information regarding the data to be collected on a per node basis. For example, a utility may specify that metering data such as load profile, demand, TOU, etc. is to be collected from particular meter(s) 114a. Reports 214 containing information on the network configuration may be automatically generated or in accordance with a utility request.

The network management system (NMS) 204 maintains a database describing the current state of the global fixed network system (current network state 220) and a database describing the historical state of the system (historical network state 222). The current network state 220 contains data regarding current meter-to-collector assignments, etc. for each subnet/LAN 120. The historical network state 222 is a database from which the state of the network at a particular point in the past can be reconstructed. The NMS 204 is responsible for, amongst other things, providing reports 214 about the state of the network. The NMS 204 may be accessed via an API 220 that is exposed to a user interface 216 and a Customer Information System (CIS) 218. Other external interfaces may also be implemented. In addition, the data collection requirements stored in the database 212 may be set via the user interface 216 or CIS 218.

The metering automation server 206 collects data from the nodes (e.g., collectors 116) and stores the data in a database 224. The data includes metering information, such as energy consumption and may be used for billing purposes, etc. by a utility provider.

The network management server 202, network management system 204 and metering automation server 206 communicate with the nodes in each subnet/LAN 120 via network 110.

Figure 3A:
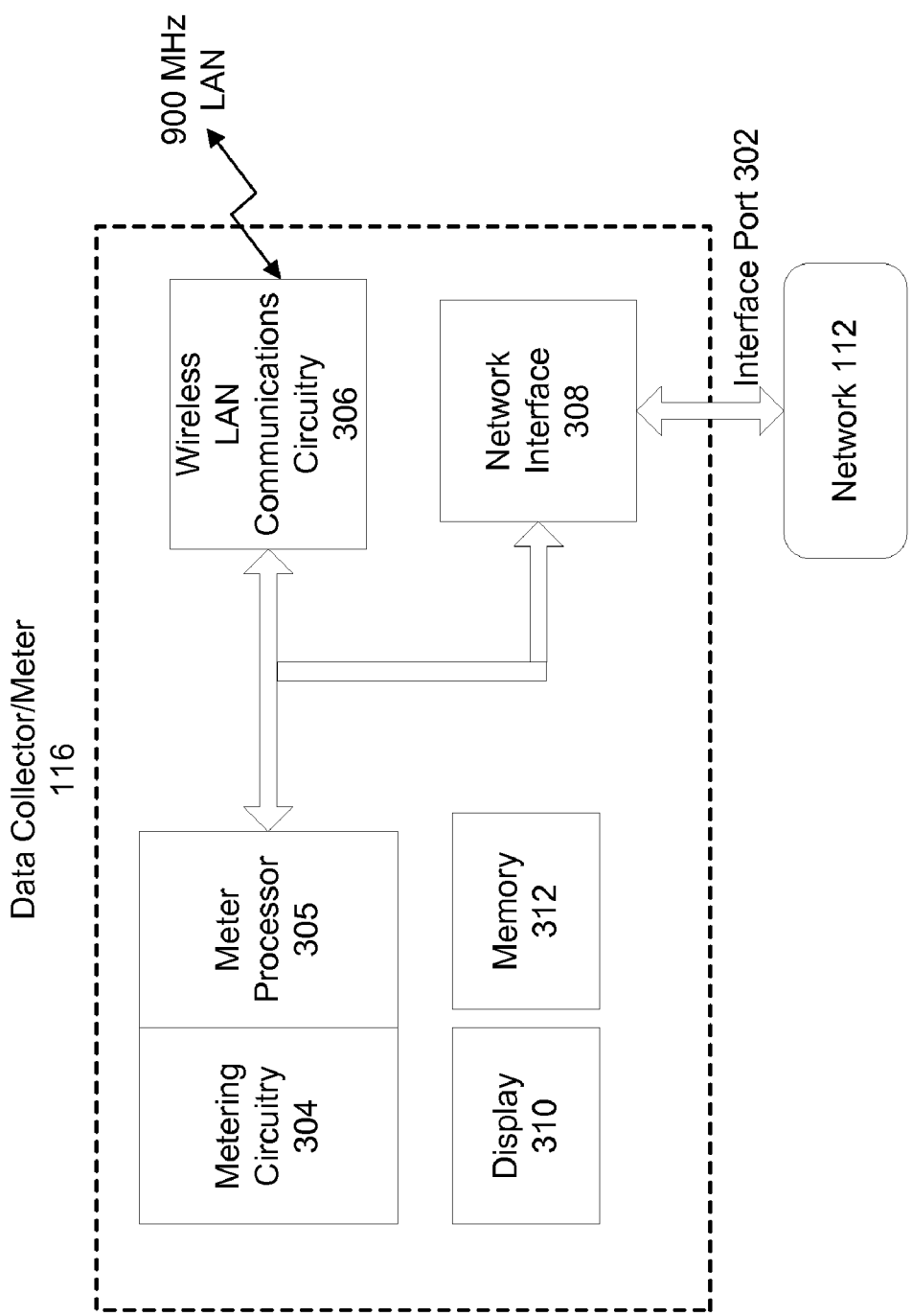
FIG. 3A is a block diagram illustrating an exemplary collector.

FIG. 3A is a block diagram illustrating further details of one embodiment of a collector 116. Although certain components are designated and discussed with reference to FIG. 3A, it should be appreciated that the invention is not limited to such components. In fact, various other components typically found in an electronic meter may be a part of collector 116, but have not been shown in FIG. 3A for the purposes of clarity and brevity. Also, the invention may use other components to accomplish the operation of collector 116. The components that are shown and the functionality described for collector 116 are provided as examples, and are not meant to be exclusive of other components or other functionality.

As shown in FIG. 3A, collector 116 may comprise metering circuitry 304 that performs measurement of consumption of a service or commodity and a processor 305 that controls the overall operation of the metering functions of the collector 116. The collector 116 may further comprise a display 310 for displaying information such as measured quantities and meter status and a memory 312 for storing data. The collector 116 further comprises wireless LAN communications circuitry 306 for communicating wirelessly with the meters 114 in a subnet/LAN and a network interface 308 for communication over the network 112.

In one embodiment, the metering circuitry 304, processor 305, display 310 and memory 312 are implemented using an A3 ALPHA meter available from Elster Electricity, Inc. In that embodiment, the wireless LAN communications circuitry 306 may be implemented by a LAN Option Board (e.g., a 900 MHz two-way radio) installed within the A3 ALPHA meter, and the network interface 308 may be implemented by a WAN Option Board (e.g., a telephone modem) also installed within the A3 ALPHA meter. In this embodiment, the WAN Option Board 308 routes messages from network 112 (via interface port 302) to either the meter processor 305 or the LAN Option Board 306. LAN Option Board 306 may use a transceiver (not shown), for example a 900 MHz radio, to communicate data to meters 114. Also, LAN Option Board 306 may have sufficient memory to store data received from meters 114. This data may include, but is not limited to the following: current billing data (e.g., the present values stored and displayed by meters 114), previous billing period data, previous season data, and load profile data.

LAN Option Board 306 may be capable of synchronizing its time to a real time clock (not shown) in A3 ALPHA meter, thereby synchronizing the LAN reference time to the time in the meter. The processing necessary to carry out the communication functionality and the collection and storage of metering data of the collector 116 may be handled by the processor 305 and/or additional processors (not shown) in the LAN Option Board 306 and the WAN Option Board 308.

The responsibility of a collector 116 is wide and varied. Generally, collector 116 is responsible for managing, processing and routing data communicated between the collector and network 112 and between the collector and meters 114. Collector 116 may continually or intermittently read the current data from meters 114 and store the data in a database (not shown) in collector 116. Such current data may include but is not limited to the total kWh usage, the Time-Of-Use (TOU) kWh usage, peak kW demand, and other energy consumption measurements and status information. Collector 116 also may read and store previous billing and previous season data from meters 114 and store the data in the database in collector 116. The database may be implemented as one or more tables of data within the collector 116.

Figure 3B:
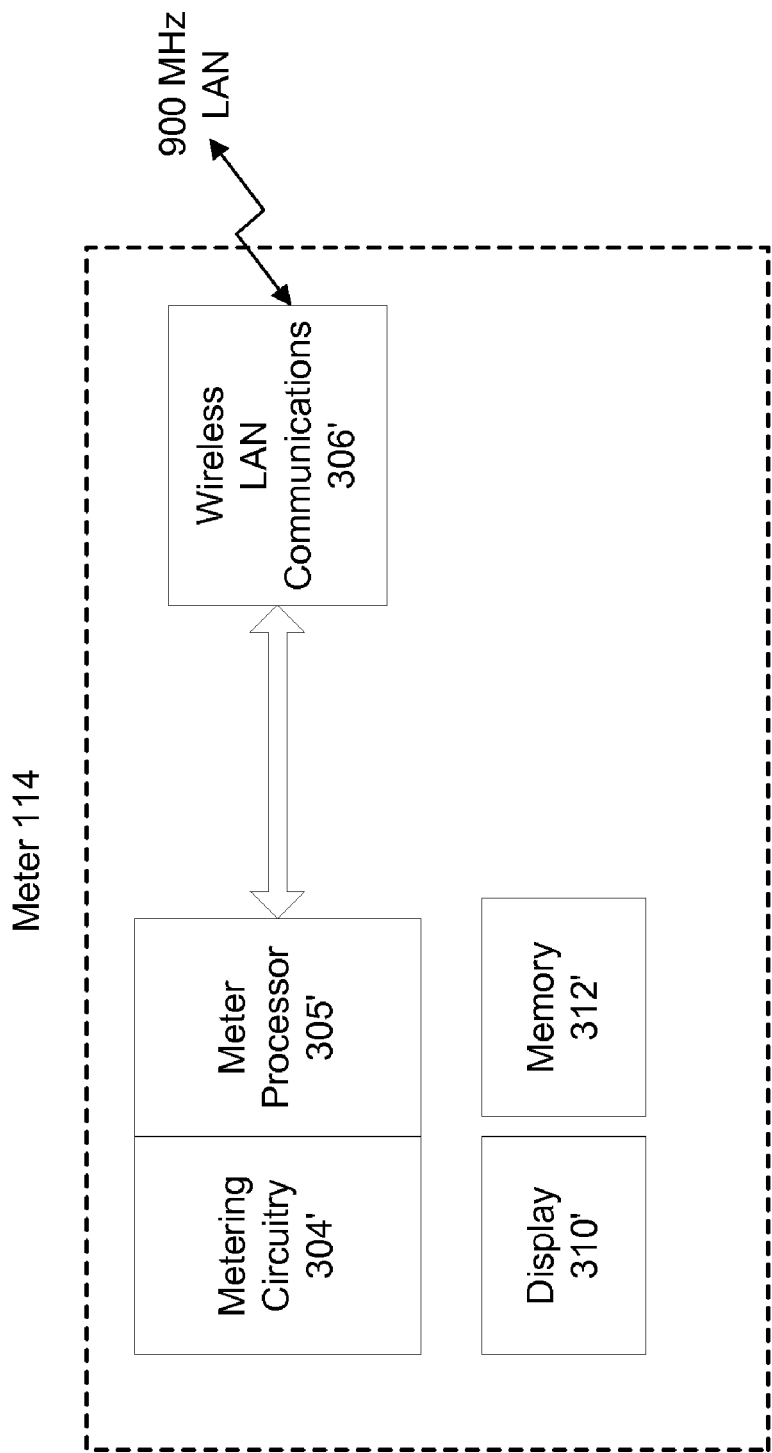
FIG. 3B is a block diagram illustrating an exemplary meter.

FIG. 3B is a block diagram of an exemplary embodiment of a meter 114 that may operate in the system 110 of FIGS. 1 and 2. As shown, the meter 114 comprises metering circuitry 304' for measuring the amount of a service or commodity that is consumed, a processor 305' that controls the overall functions of the meter, a display 310' for displaying meter data and status information, and a memory 312' for storing data and program instructions. The meter 114 further comprises wireless communications circuitry 306' for transmitting and receiving data to/from other meters 114 or a collector 116.

Referring again to FIG. 1, in the exemplary embodiment shown, a collector 116 directly communicates with only a subset of the plurality of meters 114 in its particular subnet/LAN. Meters 114 with which collector 116 directly communicates may be referred to as "level one" meters 114a. The level one meters 114a are said to be one "hop" from the collector 116. Communications between collector 116 and meters 114 other than level one meters 114a are relayed through the level one meters 114a. Thus, the level one meters 114a operate as repeaters for communications between collector 116 and meters 114 located further away in subnet 120.

Each level one meter 114a typically will only be in range to directly communicate with only a subset of the remaining meters 114 in the subnet 120. The meters 114 with which the level one meters 114a directly communicate may be referred to as level two meters 114b. Level two meters 114b are one "hop" from level one meters 114a, and therefore two "hops" from collector 116. Level two meters 114b operate as repeaters for communications between the level one meters 114a and meters 114 located further away from collector 116 in the subnet 120.

While only three levels of meters are shown (collector 116, first level 114a, second level 114b) in FIG. 1, a subnet 120 may comprise any number of levels of meters 114. For example, a subnet 120 may comprise one level of meters but might also comprise eight or more levels of meters 114. In an embodiment wherein a subnet comprises eight levels of meters 114, as many as 1024 meters might be registered with a single collector 116.

As mentioned above, each meter 114 and collector 116 that is installed in the system 110 has a unique identifier (LAN ID) stored thereon that uniquely identifies the device from all other devices in the system 110. Additionally, meters 114 operating in a subnet 120 comprise information including the following: data identifying the collector with which the meter is registered; the level in the subnet at which the meter is located; the repeater meter at the prior level with which the meter communicates to send and receive data to/from the collector; an identifier indicating whether the meter is a repeater for other nodes in the subnet; and if the meter operates as a repeater, the identifier that uniquely identifies the repeater within the particular subnet, and the number of meters for which it is a repeater. Collectors 116 have stored thereon all of this same data for all meters 114 that are registered therewith. Thus, collector 116 comprises data identifying all nodes registered therewith as well as data identifying the registered path by which data is communicated from the collector to each node. Each meter 114 therefore has a designated communications path to the collector that is either a direct path (e.g., all level one nodes) or an indirect path through one or more intermediate nodes that serve as repeaters.

Information is transmitted in this embodiment in the form of packets. For most network tasks such as, for example, reading meter data, collector 116 communicates with meters 114 in the subnet 120 using point-to-point transmissions. For example, a message or instruction from collector 116 is routed through the designated set of repeaters to the desired meter 114. Similarly, a meter 114 communicates with collector 116 through the same set of repeaters, but in reverse.

In some instances, however, collector 116 may need to quickly communicate information to all meters 114 located in its subnet 120. Accordingly, collector 116 may issue a broadcast message that is meant to reach all nodes in the subnet 120. The broadcast message may be referred to as a "flood broadcast message." A flood broadcast originates at collector 116 and propagates through the entire subnet 120 one level at a time. For example, collector 116 may transmit a flood broadcast to all first level meters 114a. The first level meters 114a that receive the message pick a random time slot and retransmit the broadcast message to second level meters 114b. Any second level meter 114b can accept the broadcast, thereby providing better coverage from the collector out to the end point meters. Similarly, the second level meters 114b that receive the broadcast message pick a random time slot and communicate the broadcast message to third level meters. This process continues out until the end nodes of the subnet. Thus, a broadcast message gradually propagates outward from the collector to the nodes of the subnet 120.

The flood broadcast packet header contains information to prevent nodes from repeating the flood broadcast packet more than once per level. For example, within a flood broadcast message, a field might exist that indicates to meters/nodes which receive the message, the level of the subnet the message is located; only nodes at that particular level may re-broadcast the message to the next level. If the collector broadcasts a flood message with a level of 1, only level 1 nodes may respond. Prior to re-broadcasting the flood message, the level 1 nodes increment the field to 2 so that only level 2 nodes respond to the broadcast. Information within the flood broadcast packet header ensures that a flood broadcast will eventually die out.

Generally, a collector 116 issues a flood broadcast several times, e.g. five times, successively to increase the probability that all meters in the subnet 120 receive the broadcast. A delay is introduced before each new broadcast to allow the previous broadcast packet time to propagate through all levels of the subnet.

Meters 114 may have a clock formed therein. However, meters 114 often undergo power interruptions that can interfere with the operation of any clock therein. Accordingly, the clocks internal to meters 114 cannot be relied upon to provide an accurate time reading. Having the correct time is necessary, however, when time of use metering is being employed. Indeed, in an embodiment, time of use schedule data may also be comprised in the same broadcast message as the time. Accordingly, collector 116 periodically flood broadcasts the real time to meters 114 in subnet 120. Meters 114 use the time broadcasts to stay synchronized with the rest of the subnet 120. In an illustrative embodiment, collector 116 broadcasts the time every 15 minutes. The broadcasts may be made near the middle of 15 minute clock boundaries that are used in performing load profiling and time of use (TOU) schedules so as to minimize time changes near these boundaries. Maintaining time synchronization is important to the proper operation of the subnet 120. Accordingly, lower priority tasks performed by collector 116 may be delayed while the time broadcasts are performed.

In an illustrative embodiment, the flood broadcasts transmitting time data may be repeated, for example, five times, so as to increase the probability that all nodes receive the time. Furthermore, where time of use schedule data is communicated in the same transmission as the timing data, the subsequent time transmissions allow a different piece of the time of use schedule to be transmitted to the nodes.

Exception messages are used in subnet 120 to transmit unexpected events that occur at meters 114 to collector 116. In an embodiment, the first 4 seconds of every 32-second period are allocated as an exception window for meters 114 to transmit exception messages. Meters 114 transmit their exception messages early enough in the exception window so the message has time to propagate to collector 116 before the end of the exception window. Collector 116 may process the exceptions after the 4-second exception window. Generally, a collector 116 acknowledges exception messages, and collector 116 waits until the end of the exception window to send this acknowledgement.

In an illustrative embodiment, exception messages are configured as one of three different types of exception messages: local exceptions, which are handled directly by the collector 116 without intervention from metering automation server 206; an immediate exception, which is generally relayed to metering automation server 206 under an expedited schedule; and a daily exception, which is communicated to the communication server 122 on a regular schedule.

Exceptions are processed as follows. When an exception is received at collector 116, the collector 116 identifies the type of exception that has been received. If a local exception has been received, collector 116 takes an action to remedy the problem. For example, when collector 116 receives an exception requesting a "node scan request" such as discussed below, collector 116 transmits a command to initiate a scan procedure to the meter 114 from which the exception was received.

If an immediate exception type has been received, collector 116 makes a record of the exception. An immediate exception might identify, for example, that there has been a power outage. Collector 116 may log the receipt of the exception in one or more tables or files. In an illustrative example, a record of receipt of an immediate exception is made in a table referred to as the "Immediate Exception Log Table." Collector 116 then waits a set period of time before taking further action with respect to the immediate exception. For example, collector 116 may wait 64 seconds. This delay period allows the exception to be corrected before communicating the exception to the metering automation server 206. For example, where a power outage was the cause of the immediate exception, collector 116 may wait a set period of time to allow for receipt of a message indicating the power outage has been corrected.

If the exception has not been corrected, collector 116 communicates the immediate exception to metering automation server 206. For example, collector 116 may initiate a dial-up connection with metering automation server 206 and download the exception data. After reporting an immediate exception to metering automation server 206, collector 116 may delay reporting any additional immediate exceptions for a period of time such as ten minutes. This is to avoid reporting exceptions from other meters 114 that relate to, or have the same cause as, the exception that was just reported.

If a daily exception was received, the exception is recorded in a file or a database table. Generally, daily exceptions are occurrences in the subnet 120 that need to be reported to metering automation server 206, but are not so urgent that they need to be communicated immediately. For example, when collector 116 registers a new meter 114 in subnet 120, collector 116 records a daily exception identifying that the registration has taken place. In an illustrative embodiment, the exception is recorded in a database table referred to as the "Daily Exception Log Table." Collector 116 communicates the daily exceptions to metering automation server 206. Generally, collector 116 communicates the daily exceptions once every 24 hours.

In the present embodiment, a collector assigns designated communications paths to meters with bi-directional communication capability, and may change the communication paths for previously registered meters if conditions warrant. For example, when a collector 116 is initially brought into system 110, it needs to identify and register meters in its subnet 120. A "node scan" refers to a process of communication between a collector 116 and meters 114 whereby the collector may identify and register new nodes in a subnet 120 and allow previously registered nodes to switch paths. A collector 116 can implement a node scan on the entire subnet, referred to as a "full node scan," or a node scan can be performed on specially identified nodes, referred to as a "node scan retry."

A full node scan may be performed, for example, when a collector is first installed. The collector 116 must identify and register nodes from which it will collect usage data. The collector 116 initiates a node scan by broadcasting a request, which may be referred to as a Node Scan Procedure request. Generally, the Node Scan Procedure request directs that all unregistered meters 114 or nodes that receive the request respond to the collector 116. The request may comprise information such as the unique address of the collector that initiated the procedure. The signal by which collector 116 transmits this request may have limited strength and therefore is detected only at meters 114 that are in proximity of collector 116. Meters 114 that receive the Node Scan Procedure request respond by transmitting their unique identifier as well as other data.

For each meter from which the collector receives a response to the Node Scan Procedure request, the collector tries to qualify the communications path to that meter before registering the meter with the collector. That is, before registering a meter, the collector 116 attempts to determine whether data communications with the meter will be sufficiently reliable. In one embodiment, the collector 116 determines whether the communication path to a responding meter is sufficiently reliable by comparing a Received Signal Strength Indication (RSSI) value (i.e., a measurement of the received radio signal strength) measured with respect to the received response from the meter to a selected threshold value. For example, the threshold value may be −60 dBm. RSSI values above this threshold would be deemed sufficiently reliable. In another embodiment, qualification is performed by transmitting a predetermined number of additional packets to the meter, such as ten packets, and counting the number of acknowledgements received back from the meter. If the number of acknowledgments received is greater than or equal to a selected threshold (e.g., 8 out of 10), then the path is considered to be reliable. In other embodiments, a combination of the two qualification techniques may be employed.

If the qualification threshold is not met, the collector 116 may add an entry for the meter to a "Straggler Table." The entry includes the meter's LAN ID, its qualification score (e.g., 5 out of 10; or its RSSI value), its level (in this case level one) and the unique ID of its parent (in this case the collector's ID).

If the qualification threshold is met or exceeded, the collector 116 registers the node. Registering a meter 114 comprises updating a list of the registered nodes at collector 116. For example, the list may be updated to identify the meter's system-wide unique identifier and the communication path to the node. Collector 116 also records the meter's level in the subnet (i.e. whether the meter is a level one node, level two node, etc.), whether the node operates as a repeater, and if so, the number of meters for which it operates as a repeater. The registration process further comprises transmitting registration information to the meter 114. For example, collector 116 forwards to meter 114 an indication that it is registered, the unique identifier of the collector with which it is registered, the level the meter exists at in the subnet, and the unique identifier of its parent meter that will server as a repeater for messages the meter may send to the collector. In the case of a level one node, the parent is the collector itself. The meter stores this data and begins to operate as part of the subnet by responding to commands from its collector 116.

Qualification and registration continues for each meter that responds to the collector's initial Node Scan Procedure request. The collector 116 may rebroadcast the Node Scan Procedure additional times so as to insure that all meters 114 that may receive the Node Scan Procedure have an opportunity for their response to be received and the meter qualified as a level one node at collector 116.

The node scan process then continues by performing a similar process as that described above at each of the now registered level one nodes. This process results in the identification and registration of level two nodes. After the level two nodes are identified, a similar node scan process is performed at the level two nodes to identify level three nodes, and so on.

Specifically, to identify and register meters that will become level two meters, for each level one meter, in succession, the collector 116 transmits a command to the level one meter, which may be referred to as an "Initiate Node Scan Procedure" command. This command instructs the level one meter to perform its own node scan process. The request comprises several data items that the receiving meter may use in completing the node scan. For example, the request may comprise the number of timeslots available for responding nodes, the unique address of the collector that initiated the request, and a measure of the reliability of the communications between the target node and the collector. As described below, the measure of reliability may be employed during a process for identifying more reliable paths for previously registered nodes.

The meter that receives the Initiate Node Scan Response request responds by performing a node scan process similar to that described above. More specifically, the meter broadcasts a request to which all unregistered nodes may respond. The request comprises the number of timeslots available for responding nodes (which is used to set the period for the node to wait for responses), the unique address of the collector that initiated the node scan procedure, a measure of the reliability of the communications between the sending node and the collector (which may be used in the process of determining whether a meter's path may be switched as described below), the level within the subnet of the node sending the request, and an RSSI threshold (which may also be used in the process of determining whether a registered meter's path may be switched). The meter issuing the node scan request then waits for and receives responses from unregistered nodes. For each response, the meter stores in memory the unique identifier of the responding meter. This information is then transmitted to the collector.

For each unregistered meter that responded to the node scan issued by the level one meter, the collector attempts again to determine the reliability of the communication path to that meter. In one embodiment, the collector sends a "Qualify Nodes Procedure" command to the level one node which instructs the level one node to transmit a predetermined number of additional packets to the potential level two node and to record the number of acknowledgements received back from the potential level two node. This qualification score (e.g., 8 out of 10) is then transmitted back to the collector, which again compares the score to a qualification threshold. In other embodiments, other measures of the communications reliability may be provided, such as an RSSI value.

If the qualification threshold is not met, then the collector adds an entry for the node in the Straggler Table, as discussed above. However, if there already is an entry in the Straggler Table for the node, the collector will update that entry only if the qualification score for this node scan procedure is better than the recorded qualification score from the prior node scan that resulted in an entry for the node.

If the qualification threshold is met or exceeded, the collector 116 registers the node. Again, registering a meter 114 at level two comprises updating a list of the registered nodes at collector 116. For example, the list may be updated to identify the meter's unique identifier and the level of the meter in the subnet. Additionally, the collector's 116 registration information is updated to reflect that the meter 114 from which the scan process was initiated is identified as a repeater (or parent) for the newly registered node. The registration process further comprises transmitting information to the newly registered meter as well as the meter that will serve as a repeater for the newly added node. For example, the node that issued the node scan response request is updated to identify that it operates as a repeater and, if it was previously registered as a repeater, increments a data item identifying the number of nodes for which it serves as a repeater. Thereafter, collector 116 forwards to the newly registered meter an indication that it is registered, an identification of the collector 116 with which it is registered, the level the meter exists at in the subnet, and the unique identifier of the node that will serve as its parent, or repeater, when it communicates with the collector 116.

The collector then performs the same qualification procedure for each other potential level two node that responded to the level one node's node scan request. Once that process is completed for the first level one node, the collector initiates the same procedure at each other level one node until the process of qualifying and registering level two nodes has been completed at each level one node. Once the node scan procedure has been performed by each level one node, resulting in a number of level two nodes being registered with the collector, the collector will then send the Initiate Node Scan Response command to each level two node, in turn. Each level two node will then perform the same node scan procedure as performed by the level one nodes, potentially resulting in the registration of a number of level three nodes. The process is then performed at each successive node, until a maximum number of levels is reached (e.g., seven levels) or no unregistered nodes are left in the subnet.

It will be appreciated that in the present embodiment, during the qualification process for a given node at a given level, the collector qualifies the last "hop" only. For example, if an unregistered node responds to a node scan request from a level four node, and therefore, becomes a potential level five node, the qualification score for that node is based on the reliability of communications between the level four node and the potential level five node (i.e., packets transmitted by the level four node versus acknowledgments received from the potential level five node), not based on any measure of the reliability of the communications over the full path from the collector to the potential level five node. In other embodiments, of course, the qualification score could be based on the full communication path.

At some point, each meter will have an established communication path to the collector which will be either a direct path (i.e., level one nodes) or an indirect path through one or more intermediate nodes that serve as repeaters. If during operation of the network, a meter registered in this manner fails to perform adequately, it may be assigned a different path or possibly to a different collector as described below.

As previously mentioned, a full node scan may be performed when a collector 116 is first introduced to a network. At the conclusion of the full node scan, a collector 116 will have registered a set of meters 114 with which it communicates and reads metering data. Full node scans might be periodically performed by an installed collector to identify new meters 114 that have been brought on-line since the last node scan and to allow registered meters to switch to a different path.

In addition to the full node scan, collector 116 may also perform a process of scanning specific meters 114 in the subnet 120, which is referred to as a "node scan retry." For example, collector 116 may issue a specific request to a meter 114 to perform a node scan outside of a full node scan when on a previous attempt to scan the node, the collector 116 was unable to confirm that the particular meter 114 received the node scan request. Also, a collector 116 may request a node scan retry of a meter 114 when during the course of a full node scan the collector 116 was unable to read the node scan data from the meter 114. Similarly, a node scan retry will be performed when an exception procedure requesting an immediate node scan is received from a meter 114.

The system 110 also automatically reconfigures to accommodate a new meter 114 that may be added. More particularly, the system identifies that the new meter has begun operating and identifies a path to a collector 116 that will become responsible for collecting the metering data. Specifically, the new meter will broadcast an indication that it is unregistered. In one embodiment, this broadcast might be, for example, embedded in, or relayed as part of a request for an update of the real time as described above. The broadcast will be received at one of the registered meters 114 in proximity to the meter that is attempting to register. The registered meter 114 forwards the time to the meter that is attempting to register. The registered node also transmits an exception request to its collector 116 requesting that the collector 116 implement a node scan, which presumably will locate and register the new meter. The collector 116 then transmits a request that the registered node perform a node scan. The registered node will perform the node scan, during which it requests that all unregistered nodes respond. Presumably, the newly added, unregistered meter will respond to the node scan. When it does, the collector will then attempt to qualify and then register the new node in the same manner as described above.

Once a communication path between the collector and a meter is established, the meter can begin transmitting its meter data to the collector and the collector can transmit data and instructions to the meter. As mentioned above, data is transmitted in packets. "Outbound" packets are packets transmitted from the collector to a meter at a given level. In one embodiment, outbound packets contain the following fields, but other fields may also be included:

Length—the length of the packet;
SrcAddr—source address—in this case, the ID of the collector;
DestAddr—the LAN ID of the meter to which the packet addressed;
    RptPath—the communication path to the destination meter (i.e., the list of identifiers of each repeater in the path from the collector to the destination node); and
    Data—the payload of the packet.

The packet may also include integrity check information (e.g., CRC), a pad to fill-out unused portions of the packet and other control information. When the packet is transmitted from the collector, it will only be forwarded on to the destination meter by those repeater meters whose identifiers appear in the RptPath field. Other meters that may receive the packet, but that are not listed in the path identified in the RptPath field will not repeat the packet.

"Inbound" packets are packets transmitted from a meter at a given level to the collector. In one embodiment, inbound packets contain the following fields, but other fields may also be included:

Length—the length of the packet;
SrcAddr—source address—the address of the meter that initiated the packet;
DestAddr—the ID of the collector to which the packet is to be transmitted;
   RptAddr—the ID of the parent node that serves as the next repeater for the sending node;
   Data—the payload of the packet;

Because each meter knows the identifier of its parent node (i.e., the node in the next lower level that serves as a repeater for the present node), an inbound packet need only identify who is the next parent. When a node receives an inbound packet, it checks to see if the RptAddr matches its own identifier. If not, it discards the packet. If so, it knows that it is supposed to forward the packet on toward the collector. The node will then replace the RptAddr field with the identifier of its own parent and will then transmit the packet so that its parent will receive it. This process will continue through each repeater at each successive level until the packet reaches the collector.

For example, suppose a meter at level three initiates transmission of a packet destined for its collector. The level three node will insert in the RptAddr field of the inbound packet the identifier of the level two node that serves as a repeater for the level three node. The level three node will then transmit the packet. Several level two nodes may receive the packet, but only the level two node having an identifier that matches the identifier in the RptAddr field of the packet will acknowledge it. The other will discard it. When the level two node with the matching identifier receives the packet, it will replace the RptAddr field of the packet with the identifier of the level one packet that serves as a repeater for that level two packet, and the level two packet will then transmit the packet. This time, the level one node having the identifier that matches the RptAddr field will receive the packet. The level one node will insert the identifier of the collector in the RptAddr field and will transmit the packet. The collector will then receive the packet to complete the transmission.

A collector 116 periodically retrieves meter data from the meters that are registered with it. For example, meter data may be retrieved from a meter every 4 hours. Where there is a problem with reading the meter data on the regularly scheduled interval, the collector will try to read the data again before the next regularly scheduled interval. Nevertheless, there may be instances wherein the collector 116 is unable to read metering data from a particular meter 114 for a prolonged period of time. The meters 114 store an indication of when they are read by their collector 116 and keep track of the time since their data has last been collected by the collector 116. If the length of time since the last reading exceeds a defined threshold, such as for example, 18 hours, presumably a problem has arisen in the communication path between the particular meter 114 and the collector 116. Accordingly, the meter 114 changes its status to that of an unregistered meter and attempts to locate a new path to a collector 116 via the process described above for a new node. Thus, the exemplary system is operable to reconfigure itself to address inadequacies in the system.

In some instances, while a collector 116 may be able to retrieve data from a registered meter 114 occasionally, the level of success in reading the meter may be inadequate. For example, if a collector 116 attempts to read meter data from a meter 114 every 4 hours but is able to read the data, for example, only 70 percent of the time or less, it may be desirable to find a more reliable path for reading the data from that particular meter. Where the frequency of reading data from a meter 114 falls below a desired success level, the collector 116 transmits a message to the meter 114 to respond to node scans going forward. The meter 114 remains registered but will respond to node scans in the same manner as an unregistered node as described above. In other embodiments, all registered meters may be permitted to respond to node scans, but a meter will only respond to a node scan if the path to the collector through the meter that issued the node scan is shorter (i.e., less hops) than the meter's current path to the collector. A lesser number of hops is assumed to provide a more reliable communication path than a longer path. A node scan request always identifies the level of the node that transmits the request, and using that information, an already registered node that is permitted to respond to node scans can determine if a potential new path to the collector through the node that issued the node scan is shorter than the node's current path to the collector.

If an already registered meter 114 responds to a node scan procedure, the collector 116 recognizes the response as originating from a registered meter but that by re-registering the meter with the node that issued the node scan, the collector may be able to switch the meter to a new, more reliable path. The collector 116 may verify that the RSSI value of the node scan response exceeds an established threshold. If it does not, the potential new path will be rejected. However, if the RSSI threshold is met, the collector 116 will request that the node that issued the node scan perform the qualification process described above (i.e., send a predetermined number of packets to the node and count the number of acknowledgements received). If the resulting qualification score satisfies a threshold, then the collector will register the node with the new path. The registration process comprises updating the collector 116 and meter 114 with data identifying the new repeater (i.e. the node that issued the node scan) with which the updated node will now communicate. Additionally, if the repeater has not previously performed the operation of a repeater, the repeater would need to be updated to identify that it is a repeater. Likewise, the repeater with which the meter previously communicated is updated to identify that it is no longer a repeater for the particular meter 114. In other embodiments, the threshold determination with respect to the RSSI value may be omitted. In such embodiments, only the qualification of the last "hop" (i.e., sending a predetermined number of packets to the node and counting the number of acknowledgements received) will be performed to determine whether to accept or reject the new path.

In some instances, a more reliable communication path for a meter may exist through a collector other than that with which the meter is registered. A meter may automatically recognize the existence of the more reliable communication path, switch collectors, and notify the previous collector that the change has taken place. The process of switching the registration of a meter from a first collector to a second collector begins when a registered meter 114 receives a node scan request from a collector 116 other than the one with which the meter is presently registered. Typically, a registered meter 114 does not respond to node scan requests. However, if the request is likely to result in a more reliable transmission path, even a registered meter may respond. Accordingly, the meter determines if the new collector offers a potentially more reliable transmission path. For example, the meter 114 may determine if the path to the potential new collector 116 comprises fewer hops than the path to the collector with which the meter is registered. If not, the path may not be more reliable and the meter 114 will not respond to the node scan. The meter 114 might also determine if the RSSI of the node scan packet exceeds an RSSI threshold identified in the node scan information. If so, the new collector may offer a more reliable transmission path for meter data. If not, the transmission path may not be acceptable and the meter may not respond. Additionally, if the reliability of communication between the potential new collector and the repeater that would service the meter meets a threshold established when the repeater was registered with its existing collector, the communication path to the new collector may be more reliable. If the reliability does not exceed this threshold, however, the meter 114 does not respond to the node scan.

If it is determined that the path to the new collector may be better than the path to its existing collector, the meter 114 responds to the node scan. Included in the response is information regarding any nodes for which the particular meter may operate as a repeater. For example, the response might identify the number of nodes for which the meter serves as a repeater.

The collector 116 then determines if it has the capacity to service the meter and any meters for which it operates as a repeater. If not, the collector 116 does not respond to the meter that is attempting to change collectors. If, however, the collector 116 determines that it has capacity to service the meter 114, the collector 116 stores registration information about the meter 114. The collector 116 then transmits a registration command to meter 114. The meter 114 updates its registration data to identify that it is now registered with the new collector. The collector 116 then communicates instructions to the meter 114 to initiate a node scan request. Nodes that are unregistered, or that had previously used meter 114 as a repeater respond to the request to identify themselves to collector 116. The collector registers these nodes as is described above in connection with registering new meters/nodes.

Under some circumstances it may be necessary to change a collector. For example, a collector may be malfunctioning and need to be taken off-line. Accordingly, a new communication path must be provided for collecting meter data from the meters serviced by the particular collector. The process of replacing a collector is performed by broadcasting a message to unregister, usually from a replacement collector, to all of the meters that are registered with the collector that is being removed from service. In one embodiment, registered meters may be programmed to only respond to commands from the collector with which they are registered. Accordingly, the command to unregister may comprise the unique identifier of the collector that is being replaced. In response to the command to unregister, the meters begin to operate as unregistered meters and respond to node scan requests. To allow the unregistered command to propagate through the subnet, when a node receives the command it will not unregister immediately, but rather remain registered for a defined period, which may be referred to as the "Time to Live". During this time to live period, the nodes continue to respond to application layer and immediate retries allowing the unregistration command to propagate to all nodes in the subnet. Ultimately, the meters register with the replacement collector using the procedure described above.

One of collector's 116 main responsibilities within subnet 120 is to retrieve metering data from meters 114. In one embodiment, collector 116 has as a goal to obtain at least one successful read of the metering data per day from each node in its subnet. Collector 116 attempts to retrieve the data from all nodes in its subnet 120 at a configurable periodicity. For example, collector 116 may be configured to attempt to retrieve metering data from meters 114 in its subnet 120 once every 4 hours. In greater detail, in one embodiment, the data collection process begins with the collector 116 identifying one of the meters 114 in its subnet 120. For example, collector 116 may review a list of registered nodes and identify one for reading. The collector 116 then communicates a command to the particular meter 114 that it forward its metering data to the collector 116. If the meter reading is successful and the data is received at collector 116, the collector 116 determines if there are other meters that have not been read during the present reading session. If so, processing continues. However, if all of the meters 114 in subnet 120 have been read, the collector waits a defined length of time, such as, for example, 4 hours, before attempting another read.

If during a read of a particular meter, the meter data is not received at collector 116, the collector 116 begins a retry procedure wherein it attempts to retry the data read from the particular meter. Collector 116 continues to attempt to read the data from the node until either the data is read or the next subnet reading takes place. In an embodiment, collector 116 attempts to read the data every 60 minutes. Thus, wherein a subnet reading is taken every 4 hours, collector 116 may issue three retries between subnet readings.

Figure 4:
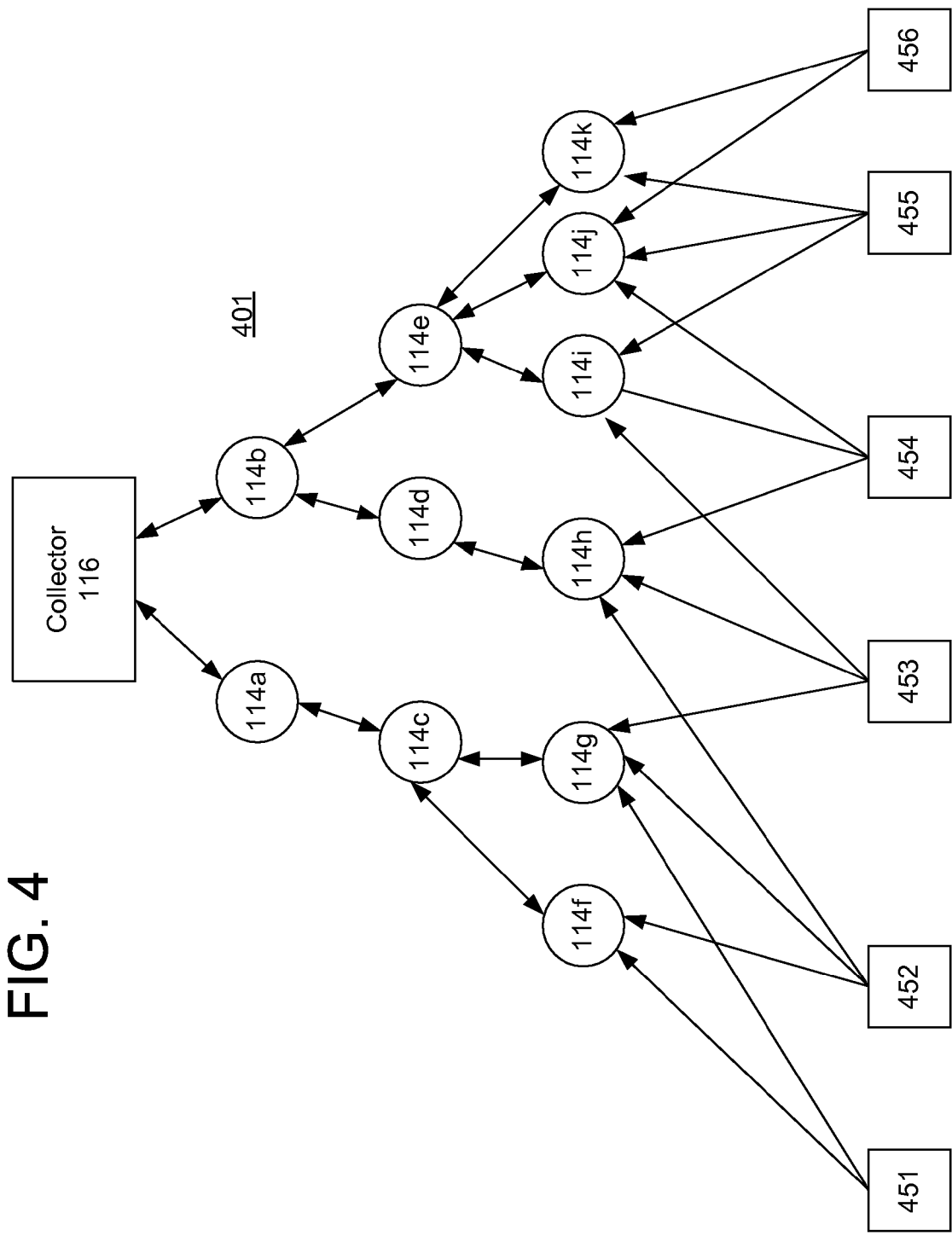
FIG. 4 is a diagram of an exemplary subnet of a wireless network for collecting data from remote devices.

Meters 114 are often two-way meters—i.e. they are operable to both receive and transmit data. However, one-way meters that are operable only to transmit and not receive data may also be deployed. FIG. 4 is a block diagram illustrating a subnet 401 that includes a number of one-way meters 451-456. As shown, meters 114a-k are two-way devices. In this example, the two-way meters 114a-k operate in the exemplary manner described above, such that each meter has a communication path to the collector 116 that is either a direct path (e.g., meters 114a and 114b have a direct path to the collector 116) or an indirect path through one or more intermediate meters that serve as repeaters. For example, meter 114h has a path to the collector through, in sequence, intermediate meters 114d and 114b. In this example embodiment, when a one-way meter (e.g., meter 451) broadcasts its usage data, the data may be received at one or more two-way meters that are in proximity to the one-way meter (e.g., two-way meters 114f and 114g). In one embodiment, the data from the one-way meter is stored in each two-way meter that receives it, and the data is designated in those two-way meters as having been received from the one-way meter. At some point, the data from the one-way meter is communicated, by each two-way meter that received it, to the collector 116. For example, when the collector reads the two-way meter data, it recognizes the existence of meter data from the one-way meter and reads it as well. After the data from the one-way meter has been read, it is removed from memory.

While the collection of data from one-way meters by the collector has been described above in the context of a network of two-way meters 114 that operate in the manner described in connection with the embodiments described above, it is understood that the present invention is not limited to the particular form of network established and utilized by the meters 114 to transmit data to the collector. Rather, the present invention may be used in the context of any network topology in which a plurality of two-way communication nodes are capable of transmitting data and of having that data propagated through the network of nodes to the collector.

According to various embodiments described herein, an automated meter data collection system uses a narrowband licensed channel, such as a UHF land-mobile band, to wake carrier-sensed, battery-powered meter reading devices (MRDs) such as the collectors 116 of FIG. 1. As discussed above, in some conventional systems in which an unlicensed channel is used to wake the MRDs, interference from other devices can result in false wakeups, which may increase power consumption and adversely affect the battery life of the MRDs. Using a narrowband licensed channel to wake the MRDs may avoid false wakeups because the narrowband licensed channel has much lower levels of traffic and therefore is significantly less affected by interference. In particular, because the licensed channel on average has very little traffic in a given area, the MRDs listening on the licensed channel are unlikely to wake from their low-power sleep mode unless their corresponding interrogator device is truly active, as the licensed channel has been coordinated to belong to that particular system of an interrogator device and the MRD or MRDs assigned to the interrogator device, for example, by a national frequency coordination body. As a result, the carrier-sensed wakeup using the narrowband licensed channel can save battery life as compared with the complicated communication protocols required on unlicensed channels.

In some embodiments, MRDs are awakened and interrogated using a licensed channel, but reply and may further communicate using a high bitrate unlicensed channel. Other embodiments combine a meshed, unlicensed network of MRDs with a roaming interrogator device using the licensed channel to send commands or perform on-demand reads of the MRDs. Such embodiments may realize the lower power consumption associated with using a licensed channel for waking the MRDs by reducing false wakeups and by reducing the amount of time required to synchronize an interrogator device with the MRDs. At the same time, using the unlicensed channel for data replies can realize higher data throughput rates than are commonly associated with the narrowband licensed channel. These benefits are generally mutually exclusive under conventional techniques that use an unlicensed channel for both wakeup and replies.

Using a single licensed channel to communicate with the MRDs may realize certain additional benefits. For example, commands can be sent to the MRDs either individually, in groups, or en masse as a broadcast, quickly and efficiently because interference is minimized. In addition, if the MRD transmits its reply on the unlicensed channel a fixed amount of time after the MRD receives a wakeup message on the licensed channel, a number of additional benefits can be realized. Specifically, the interrogator device is synchronized in time with the MRD as soon as the wakeup message is received without the need to employ frequency-search or code-search schemes that drain battery power. Further, since there is essentially no other traffic on the licensed channel, synchronization is effective the first time, avoiding the need to repeat the synchronization process and further conserving battery power. By contrast, synchronization using an unlicensed channel can require multiple tries due to interference caused by other devices occupying the same unlicensed channel.

Using a combination of a licensed channel and an unlicensed channel also promotes efficient use of the available bandwidth on each channel by placing appropriate loads on each channel. In particular, the narrowband licensed channel carries a very small wakeup/interrogation packet whose size is appropriate for the low bitrate available on the licensed channel. By contrast, the wideband unlicensed channel has a high bitrate that allows the MRD to reply with a large packet of stored data in a short time.

Figure 5:
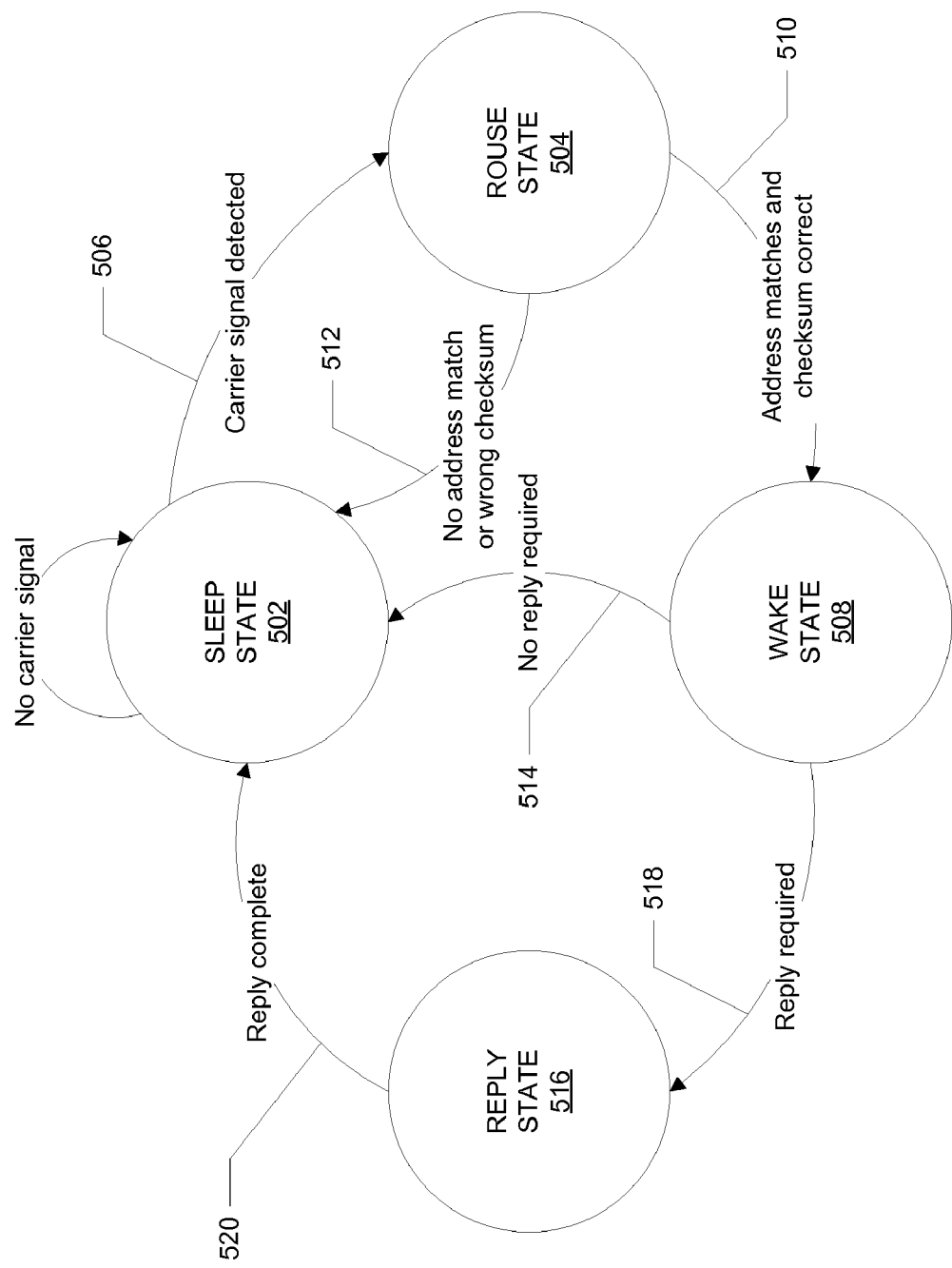
FIG. 5 is a state diagram illustrating various modes of operation of a meter reading device according to another embodiment.

FIG. 5 is a state diagram illustrating various modes of operation of a meter reading device (MRD), such as a collector 116 of FIG. 1. The MRD begins in a low power sleep state 502. In the sleep state 502, the MRD periodically powers up its radio receiver to listen on the narrowband licensed channel for a short period. For example, the MRD may power up its radio receiver approximately every ten seconds and listen for periods of approximately 500 microseconds.

If, during a listening period, the MRD detects a carrier signal whose power is above a fixed or programmable threshold, the MRD transitions to a rouse state 504, as depicted by an edge 506. The rouse state 504 indicates that a mobile interrogator device has entered the detection range of the MRD or that a fixed interrogator device has begun transmitting. In the rouse state 504, the MRD continues with its receiver on to receive data from the interrogator device. This data may include at least one of a preamble, an address, one or more command bits, and a plurality of checksum bits. If the address matches a unique address associated with the MRD and the checksum is correct, the MRD transitions to a wake state 508, as indicated by an edge 510. If either the received address does not match the address of the MRD or the checksum is not correct, the MRD determines that the data received from the interrogator device is not addressed to the MRD and returns to the sleep state 502, as indicated by an edge 512.

The wake state 508 indicates that the MRD has been successfully addressed. In the wake state 508, the MRD processes the command bits. If the command bits do not require a response to the interrogator device, the MRD performs the action or actions indicated by the command bits. For example, the MRD may set a memory register in response to the command bits. After performing the indicated actions, the MRD returns to the sleep state 502, as indicated by an edge 514.

On the other hand, if the command bits do require a response to the interrogator device, the MRD performs the action or actions indicated by the command bits and enters a relatively high power reply state 516, as indicated by an edge 518. In the reply state 516, the MRD transmits a reply to the interrogator device on an unlicensed band in the manner required by wireless agency rules. Because the bandwidth, and therefore the bitrate, are much greater on the unlicensed band as compared with the licensed band used for waking the MRD, a large amount of data, such as meter readings, stored within the MRD can be transmitted to the interrogator device. After the MRD transmits its data to the interrogator device, the MRD returns to the sleep state 502, as indicated by an edge 520.

Figure 6:
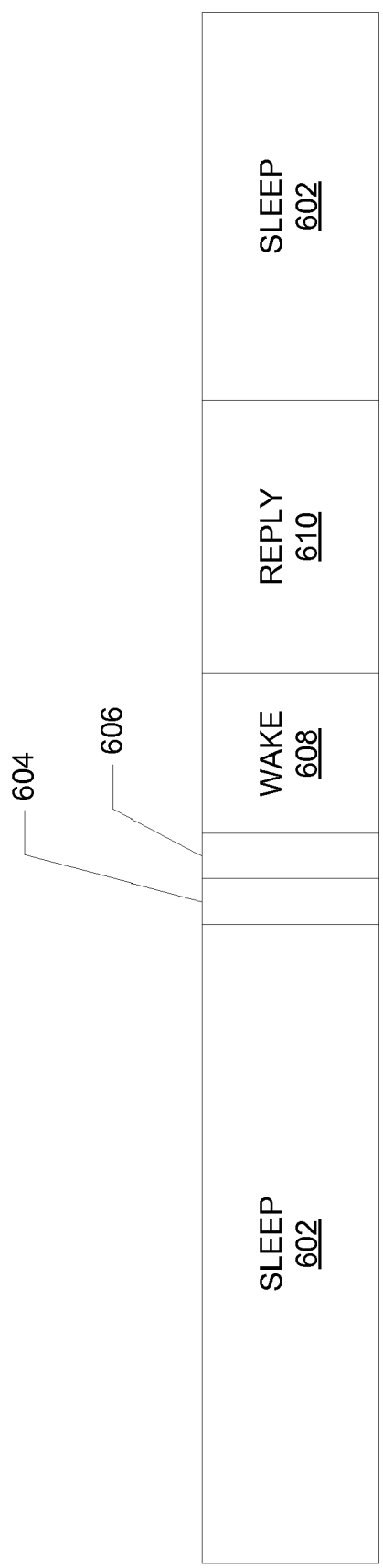
FIG. 6 is a diagram illustrating an exemplary sleep/wake cycle for a meter reading device.

FIG. 6 is a diagram illustrating an exemplary sleep/wake cycle for the MRD. The sleep and wake states need not necessarily be equivalent in length. In fact, to conserve battery power, it may be desirable for the sleep state to last for a longer period than the wake state. For example, for a sleep/wake cycle that repeats every few seconds, only a few milliseconds of the cycle may be allotted for the wake state, with the MRD sleeping for the remainder of the cycle. Accordingly, as shown in FIG. 6, typically the sleep/wake cycle includes a relatively long, e.g., ten second, sleep portion 602 in which the transceiver of the MRD is powered down such that the MRD does not transmit communications to other devices or receive communications from other devices. As discussed above, the receiver is powered up approximately every ten seconds during a listening portion 604. The listening portion is relatively short, e.g., 500 microseconds. During this period, the MRD listens for a carrier signal, or wake signal, whose power is above a fixed or programmable threshold. The carrier signal is broadcast by an interrogator device to alert the MRD that the interrogator device is approaching a physical proximity of the MRD within which the interrogator device is capable of receiving transmissions from the MRD.

The carrier signal causes the MRD to enter a rouse portion 606 in which the MRD receives data from the interrogator device. This data may include at least one of a preamble, an address, one or more command bits, and one or more checksum bits. Assuming the address matches a unique address associated with the MRD (or a predetermined group address or broadcast address) and the checksum is correct, the MRD transitions to a wake portion 608. If either of these conditions is not met, the MRD instead returns to the sleep portion 602. The sleep/wake cycle depicted in FIG. 6 assumes that the MRD transitions to the wake portion 608 of the sleep/wake cycle.

During the wake portion 608, the MRD processes the command bits. If the command bits do not require a response to the interrogator device, the MRD performs the action or actions indicated by the command bits and returns to the sleep state 602. The sleep/wake cycle depicted in FIG. 6 assumes that the command bits do require a response to the interrogator device. In this scenario, the MRD enters a reply portion 610 of the sleep/wake cycle. In the reply portion 610, the MRD transmits a reply to the interrogator device on an unlicensed band in the manner required by wireless agency rules. After transmitting the reply to the interrogator device, the MRD returns to the sleep portion 602. Alternatively, the MRD may return to wake state 508, in order to process additional commands, from either the unlicensed channel or the licensed channel.

It will be appreciated that the lengths of the sleep, rouse, wake, and reply portions of the cycle may vary from cycle to cycle depending on a variety of factors such as, for example, but not limited to, time of year, time of day, and the amount of time since the meter data was last collected by the interrogator device. For example, it may be desirable for the MRD to enter an extended sleep state for the cycle immediately after the MRD's data has been collected by the interrogator device. The lengths of the sleep, wake, rouse, and reply portions of the sleep/wake cycle, including their relative lengths with respect to one another, may vary depending upon a variety of factors such as, for example, but not limited to, the anticipated velocity of the interrogator device, the power required to operate the MRD's transceiver, and the desired battery life for the MRD. For example, the longer the sleep portion is in comparison to the wake portion, the longer the MRD's battery will last. However, the wake portion should be long enough to allow the MRD to properly receive and detect the wake signal. Additionally, it is desirable for the wake portion to repeat frequently enough to ensure that it will occur at least once during the period that the MRD is within the transmission range of the interrogator device.

Figure 7:
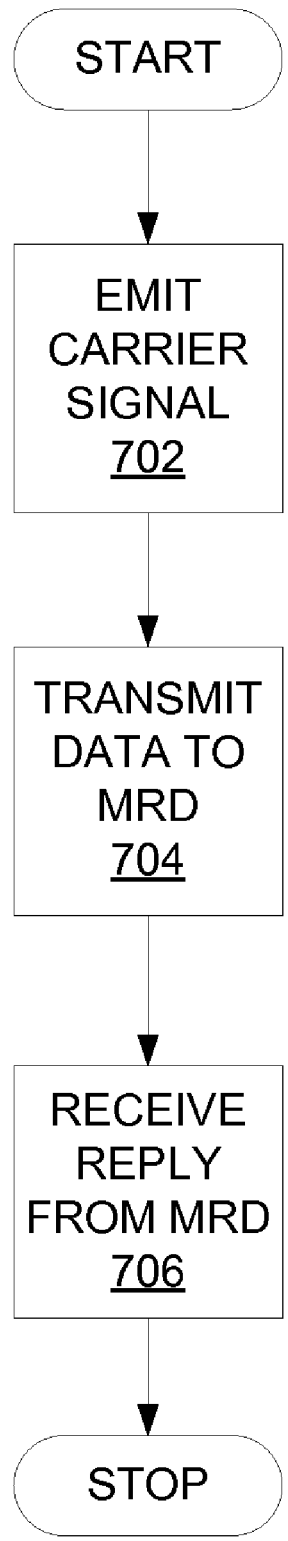
FIG. 7 is a flow diagram illustrating an exemplary method of operating an interrogator device according to yet another embodiment.

FIG. 7 is a flow diagram illustrating an exemplary method of operating an interrogator device according to yet another embodiment. As illustrated at a step 702, a transceiver of the interrogator device is caused to emit a carrier signal, or wake signal, on a narrowband licensed channel. The carrier signal causes a meter reading device (MRD) that is within range of the interrogator device to transition from the sleep state 502 of FIG. 5 to the rouse mode 504 of FIG. 5. Once the MRD is in the rouse mode 504, the interrogator device transmits data to the MRD using the narrowband licensed channel, as illustrated at a step 704. This data includes a preamble, an address of the MRD, a command, and a plurality of checksum bits. At a step 706, the interrogator device receives a reply from the MRD. This reply arrives on an unlicensed channel, which has a broader bandwidth and therefore a higher bitrate than the licensed channel that the interrogator device uses to wake the MRD.

Figure 8:
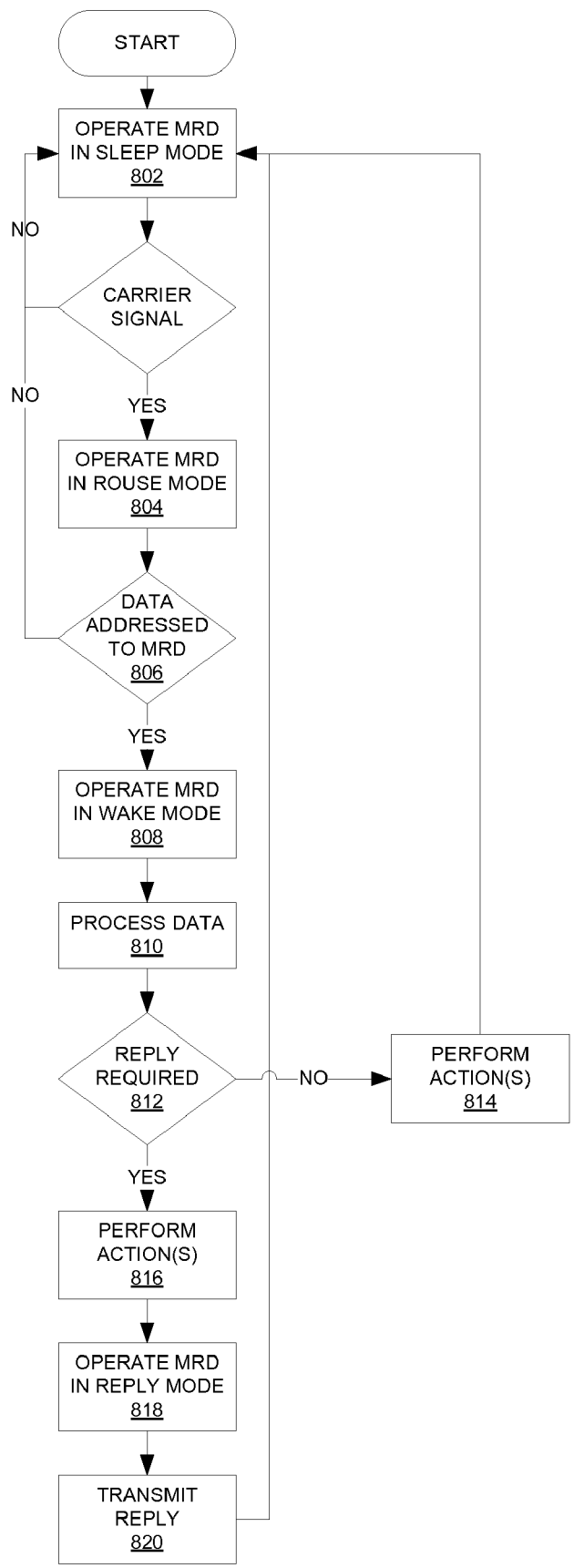
FIG. 8 is a flow diagram illustrating an exemplary method of operating a meter reading device according to still another embodiment.

FIG. 8 is a flow diagram illustrating an exemplary method of operating a meter reading device (MRD) according to still another embodiment. Initially, at a step 802, the MRD is operated in a sleep mode in which a transceiver of the MRD is generally powered down, except for brief periods during which the transceiver is powered up to listen on a licensed channel for a carrier signal, or wake signal, from an interrogator device. If no carrier signal is detected, the transceiver is again powered down and the MRD continues to operate in the sleep mode at step 802. If a carrier signal is received from the interrogator device, the MRD operates in a rouse mode at a step 804 and receives data from the interrogator via the licensed channel. The data includes a preamble, an address, a command, and a plurality of checksum bits.

Next, the MRD determines whether the data received from the interrogator is addressed to the MRD, as depicted at a step 806. If not, the MRD returns to the sleep mode at step 802. If the received data is addressed to the MRD, the MRD enters a wake mode at a step 808. In the wake mode, the MRD processes the data received from the interrogator via the licensed channel, as shown at a step 810. The MRD then determines, at a step 812, whether the data received from the interrogator device requires a reply to be transmitted back to the interrogator device. If not, the MRD performs any actions required by the received data and returns at a step 814 and returns to the sleep mode at step 802. If the received data does require a reply, the MRD performs any actions required by the received data at a step 816 and enters a reply mode at a step 818. In the reply mode, the MRD transmits the reply to the interrogator device using an unlicensed channel having a broader bandwidth than the licensed channel at a step 820. After the reply is transmitted, the MRD returns to the sleep mode at step 802.

Figure 9:
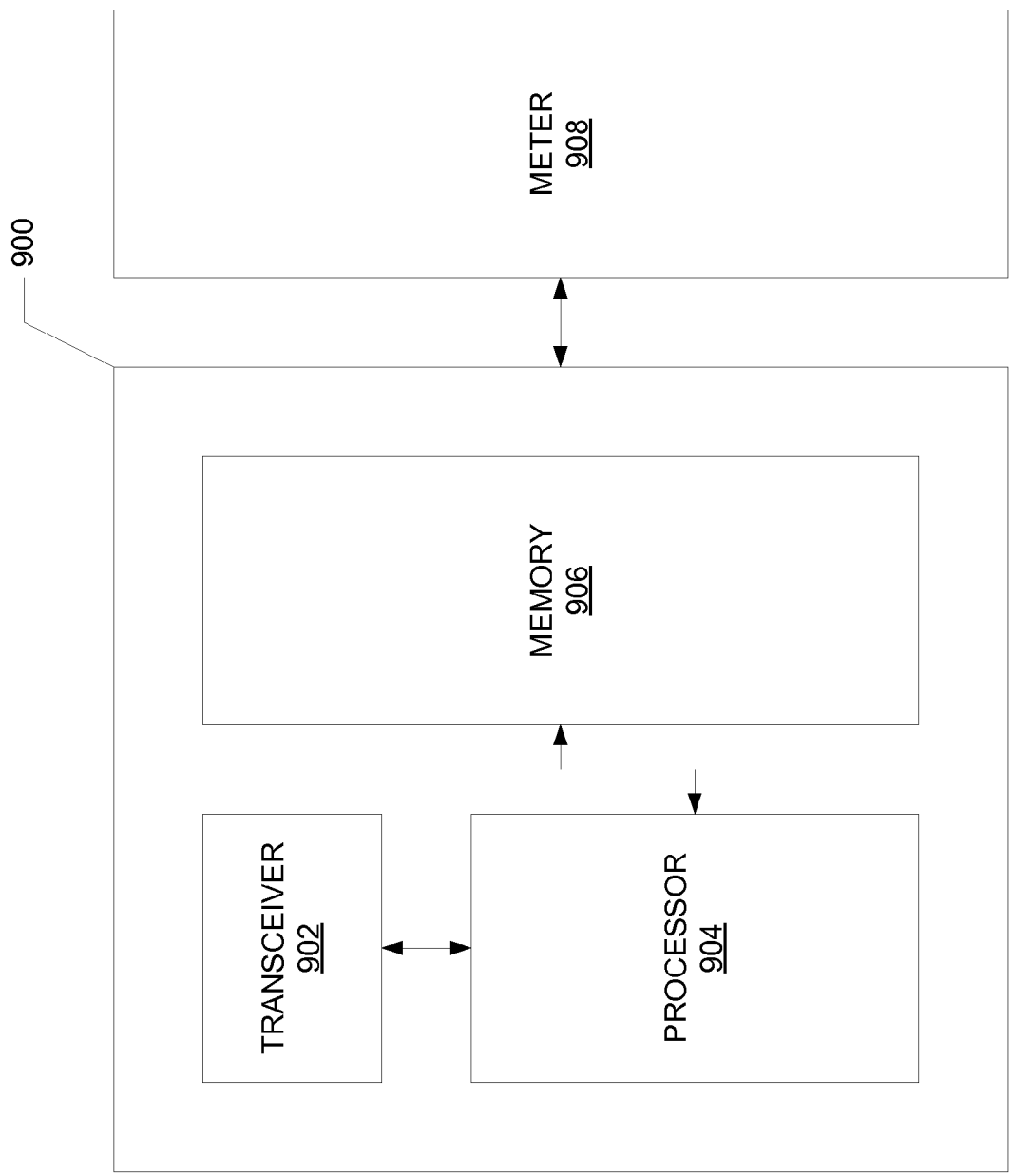
FIG. 9 is a block diagram of an exemplary meter reading device.

FIG. 9 is a block diagram of an exemplary meter reading device (MRD) 900. The MRD 900 is in communication with a meter 908 to receive data, for example, relating to utilities usage from the meter 908. The MRD 900 includes a transceiver 902 that can transmit and receive radio signals. A processor 904 is in electrical communication with the transceiver and can execute instructions to control the operation of the MRD 900. A memory 906 in electrical communication with the processor 904 stores processor-executable instructions.

In operation, the processor 904 retrieves instructions from the memory 906. The instructions cause the processor 904 to control the operation of the MRD 900 to operate in a mode selected from four operational modes. The selected mode is reconfigurable. In a sleep mode, the transceiver 902 periodically listens on a licensed channel for a carrier signal from an interrogator device (not shown in FIG. 9). In a rouse mode, the transceiver 902 receives data via the licensed channel from the interrogator device. In a wake mode, the MRD 900 processes the data received via the licensed channel in the rouse mode. Finally, in a reply mode, the transceiver 902 transmits a reply to the interrogator device on an unlicensed channel having a broader bandwidth than the licensed channel.

In another embodiment, which can be conceived as a "hybrid fixed/mobile" embodiment, the MRD uses the wideband unlicensed band to communicate with a meter or other device in a meshed network that is always listening. Once the MRD has transmitted data and the meter receives the transmission, synchronization is achieved. Two-way communication of commands as well as of stored MRD data can commence. In addition, the MRD continues to power up its licensed channel receiver periodically as described above in connection with FIGS. 5-9. A walk-by, drive-by, or fly-by interrogator device can communicate with the MRD on the licensed channel, sending commands and requesting that information be sent using the unlicensed band. In this way, the interrogator device can perform troubleshooting, setup, and on-demand reads on a meshed network device.

While systems and methods have been described and illustrated with reference to specific embodiments, those skilled in the art will recognize that modification and variations may be made without departing from the principles described above and set forth in the following claims. For example, although in the embodiments described above, the systems and methods of the present invention are described in the context of a network of metering devices, such as electricity, gas, or water meters, it is understood that the present invention can be implemented in any kind of network in which it is necessary to obtain information from or to provide information to end devices in the system, including without limitation, networks comprising meters, in-home displays, in-home thermostats, load control devices, or any combination of such devices. Accordingly, reference should be made to the following claims as describing the scope of the present invention.

What is claimed is:

1. A meter reading device comprising:
   a transceiver configured and arranged to transmit and receive radio signals;
   a processor in electrical communication with the transceiver and configured and arranged to execute processor-executable instructions to control operation of the meter reading device; and
   a memory in electrical communication with the processor and storing processor-executable instructions that, when executed by the processor, cause the processor to control the operation of the meter reading device to operate in a selected one of:
      a sleep mode in which the transceiver periodically listens on a licensed channel for a carrier signal,
      a rouse mode in which the transceiver receives data via the licensed channel, the data comprising a preamble, an address, a command, and plurality of checksum bits,
      a wake mode in which the meter reading device processes the data received via the licensed channel in the rouse mode, and
      a reply mode in which the transceiver transmits a reply on an unlicensed channel having a broader bandwidth than the licensed channel,
   wherein the selected mode in which the meter reading device operates is reconfigurable and the memory stores processor-executable instructions for causing the meter reading device to operate in the wake mode when the address in the data matches an address of the meter reading device and the plurality of checksum bits matches a checksum bit pattern.

2. The meter reading device of claim 1, wherein the memory stores processor-executable instructions for causing the meter reading device to operate in the rouse mode when the transceiver receives a carrier signal having a power exceeding a threshold power level.

3. The meter reading device of claim 2, wherein the threshold power level is programmable.

4. The meter reading device of claim 1, wherein the memory stores processor-executable instructions for:
   causing the meter reading device to operate in the reply mode when the command in the data requires a reply; and
   causing the meter reading device to perform one or more operations in response to the command in the data and to return to the sleep mode when the command in the data does not require a reply.

5. A method of operating an interrogator device comprising a transceiver, the method comprising:
   causing the transceiver to emit a carrier signal on a licensed channel, the carrier signal causing a meter reading device to transition from a sleep mode to a rouse mode;
   transmitting data from the interrogator device to the meter reading device using the licensed channel, wherein the data comprises a preamble, an address of the meter reading device, a command, and a plurality of checksum bits; and
   receiving a reply from the meter reading device on an unlicensed channel having a broader bandwidth than the licensed channel.

6. The method of claim 5, wherein the meter reading device operates in the rouse mode when the meter reading device receives a carrier signal having a power exceeding a threshold power level.

7. The method of claim 5, wherein the meter reading device operates in the wake mode when the address in the data matches an address of the meter reading device and the plurality of checksum bits matches a checksum bit pattern.

8. The method of claim 7, wherein the meter reading device operates in the reply mode when the command in the data requires a reply.

9. The method of claim 7, wherein the meter reading device performs one or more operations in response to the command in the data and returns to the sleep mode when the command in the data does not require a reply.

10. The method of claim 5, wherein the meter reading device returns to the sleep mode when the address in the data does not match an address of the meter reading device or the plurality of checksum bits does not match a checksum bit pattern.

11. The method of claim 5, further comprising synchronizing the meter reading device and a meter in communication with the meter reading device when the meter receives a transmission from the meter reading device, wherein the meter reading device and the meter are configured to communicate at least one of a command and meter data after synchronization is achieved.

12. The method of claim 5, wherein the licensed channel comprises a LF, HF, VHF or UHF band.

13. A method of operating a meter reading device comprising a transceiver, the method comprising:
   operating the meter reading device in a sleep mode in which the transceiver periodically listens on a licensed channel for a carrier signal from an interrogator;
   in response to receiving a carrier signal from the interrogator, operating the meter reading device in a rouse mode in which the transceiver receives data from the interrogator via the licensed channel;
   in response to determining that the data received from the interrogator is addressed to the meter reading device, operating the meter reading device in a wake mode in which the meter reading device processes the data received from the interrogator via the licensed channel; and in response to determining that the data received from the interrogator requires a reply, operating the meter reading device in a reply mode in which the meter reading device transmits the reply to the interrogator using an unlicensed channel having a broader bandwidth than the licensed channel.

14. The method of claim 13, wherein the data received from the interrogator device via the licensed channel comprises a preamble, an address, a command, and a plurality of checksum bits.

15. The method of claim 14, wherein the meter reading device determines that the data received from the interrogator is addressed to the meter reading device when the address in the data matches an address of the meter reading device and the plurality of checksum bits matches a checksum bit pattern.

16. The method of claim 14, further comprising returning to the sleep mode if the address in the data received from the interrogator does not match an address of the meter reading device or the plurality of checksum bits does not match a checksum bit pattern.

17. The method of claim 13, further comprising, when the command in the data does not require a reply:
  performing one or more operations in response to the command in the data; and
  returning to the sleep mode after performing the one or more operations.

18. The method of claim 13, further comprising:
  sending a transmission to a meter in communication with the meter reading device;
  synchronizing the meter reading device with the meter after the meter receives the transmission from the meter reading device; and
  communicating at least one of a command and meter data between the meter reading device and the meter after synchronization is achieved.

* * * * *